US011001206B1

(12) United States Patent
Zarecky

(10) Patent No.: US 11,001,206 B1
(45) Date of Patent: *May 11, 2021

(54) MOUNTING ASSEMBLY

(71) Applicant: National Creative Enterprises, Inc., Burnsville, MN (US)

(72) Inventor: Joshua George Zarecky, Carmel, IN (US)

(73) Assignee: National Creative Enterprises, Inc., Burnsville, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/897,411

(22) Filed: Jun. 10, 2020

Related U.S. Application Data

(63) Continuation-in-part of application No. 16/804,692, filed on Feb. 28, 2020.

(51) Int. Cl.
*B60R 11/02* (2006.01)
*F16M 11/08* (2006.01)
*F16M 13/02* (2006.01)
*B60R 11/00* (2006.01)
*F16M 11/04* (2006.01)

(52) U.S. Cl.
CPC ............ *B60R 11/00* (2013.01); *B60R 11/02* (2013.01); *B60R 2011/0078* (2013.01); *B60R 2011/0085* (2013.01); *F16M 11/041* (2013.01); *F16M 11/08* (2013.01); *F16M 13/02* (2013.01)

(58) Field of Classification Search
CPC ..... B60R 2011/0078; B60R 2011/0085; B60R 2011/0052; B60R 2011/0066; B60R 11/02; F16M 11/08; F16M 11/041; F16M 13/02
See application file for complete search history.

(56) References Cited

U.S. PATENT DOCUMENTS

| | | | | |
|---|---|---|---|---|
| 4,873,936 A * | 10/1989 | Ponticelli | ............... | B60R 11/02 116/33 |
| 4,948,083 A * | 8/1990 | McNaney, Jr. | ........ | A01K 91/08 248/289.11 |
| 7,431,027 B2 * | 10/2008 | Carpenter | ............... | F41B 11/52 124/49 |
| 8,162,690 B2 * | 4/2012 | Smith | ..................... | B60R 25/00 439/537 |
| 8,376,777 B2 * | 2/2013 | Smith | ..................... | H02G 3/14 439/537 |
| D694,228 S * | 11/2013 | Richter | ........................ | D14/253 |
| 8,578,647 B2 | 11/2013 | Storch et al. | | |
| 8,695,957 B2 | 4/2014 | Quintania et al. | | |
| 9,604,580 B2 * | 3/2017 | Boer | .................... | F16M 11/041 |
| 9,611,975 B2 * | 4/2017 | Chinn | ................... | B60P 7/0815 |
| 9,869,423 B2 * | 1/2018 | Khodapanah | ............ | B62J 11/00 |
| 9,944,217 B2 | 4/2018 | Schroeder et al. | | |
| 10,125,921 B2 * | 11/2018 | Khodapanah | .......... | F16M 13/02 |
| 10,307,313 B2 | 6/2019 | Schroeder et al. | | |
| 10,655,656 B2 * | 5/2020 | Franklin | ................... | F16B 1/00 |

(Continued)

*Primary Examiner* — Justin M Larson

(74) *Attorney, Agent, or Firm* — Thomas J. Nikolai; Dewitt LLP

(57) ABSTRACT

Mounting a device to a surface of a transport vehicle is achieved by connecting a latch post assembly to the surface and a receiver assembly to the device. The latch post assembly and the receiver assembly may then be mated together creating multiple zones of frictional contact and positive retention force preventing inadvertent decoupling of the latch post assembly and the receiver assembly.

20 Claims, 20 Drawing Sheets

(56) References Cited

U.S. PATENT DOCUMENTS

| | | | |
|---|---|---|---|
| 10,782,596 B2* | 9/2020 | Wilson | F16M 13/02 |
| 10,918,227 B2* | 2/2021 | Ditges | F16M 13/022 |
| 2006/0208139 A1* | 9/2006 | Mossman | F16M 11/12 |
| | | | 248/125.9 |
| 2007/0069093 A1* | 3/2007 | Graham | A61G 12/002 |
| | | | 248/231.71 |
| 2016/0025258 A1 | 1/2016 | Shannahan et al. | |
| 2016/0121798 A1* | 5/2016 | Lee | B60R 11/02 |
| | | | 224/483 |
| 2018/0032104 A1* | 2/2018 | Schatz | G06F 1/1683 |
| 2020/0063909 A1* | 2/2020 | Weng | F16M 13/02 |
| 2020/0272031 A1* | 8/2020 | Zhu | G03B 17/561 |
| 2020/0378546 A1* | 12/2020 | Painter | F16M 13/00 |
| 2021/0026409 A1* | 1/2021 | Miles | F16M 11/105 |

* cited by examiner

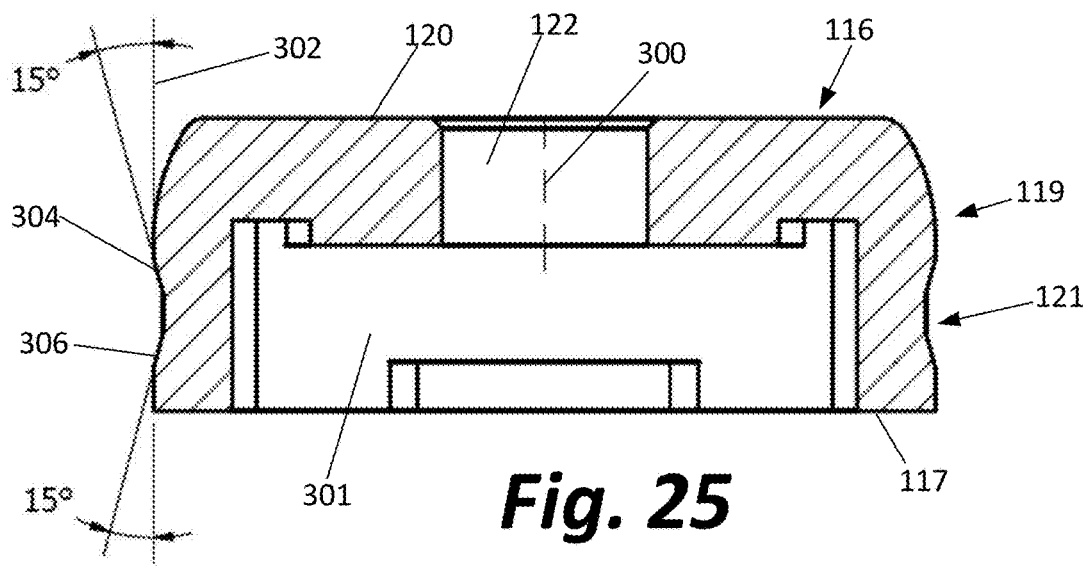
Fig. 25
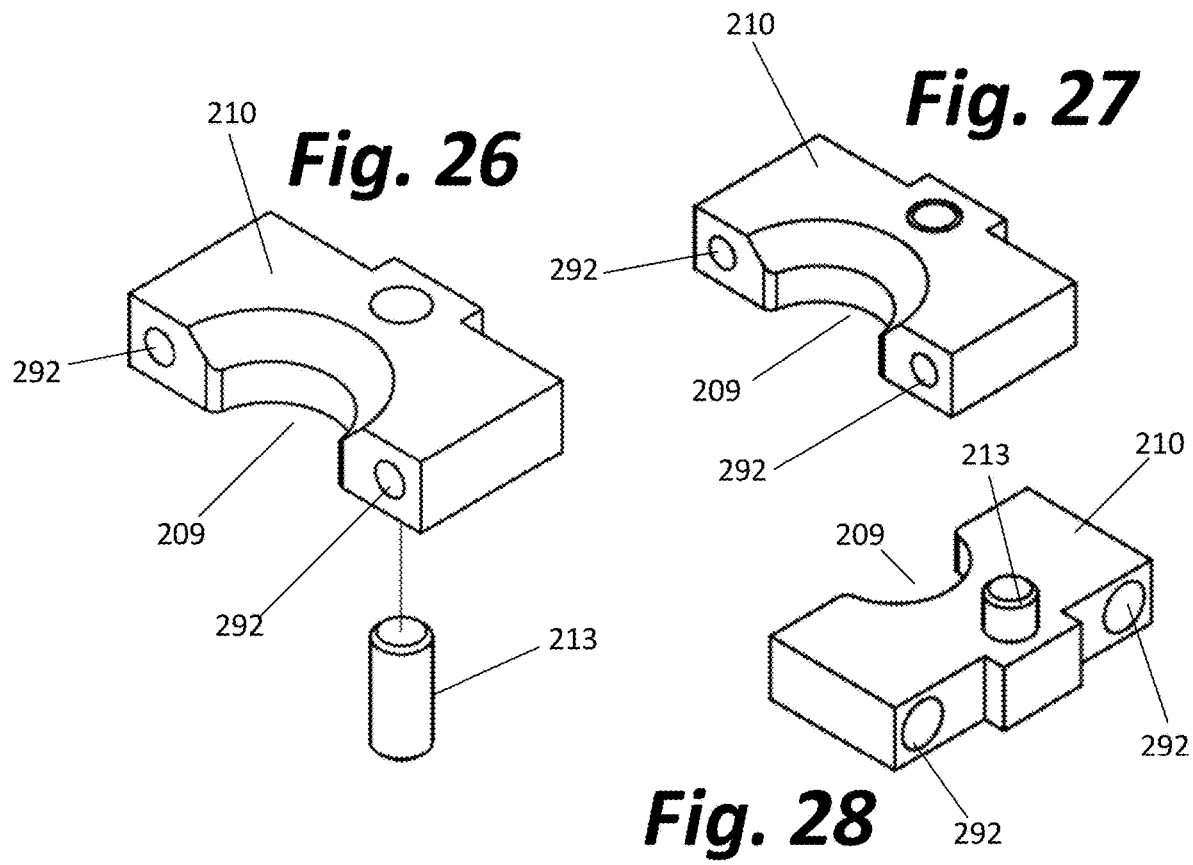
Fig. 26
Fig. 27
Fig. 28

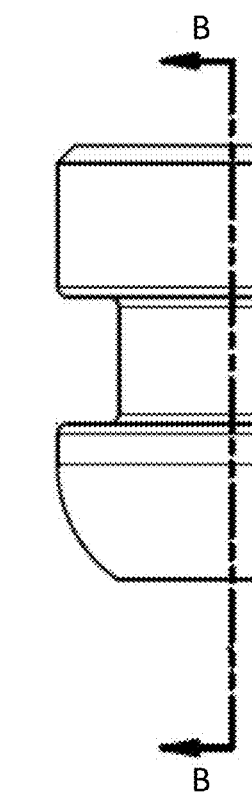
Fig. 33
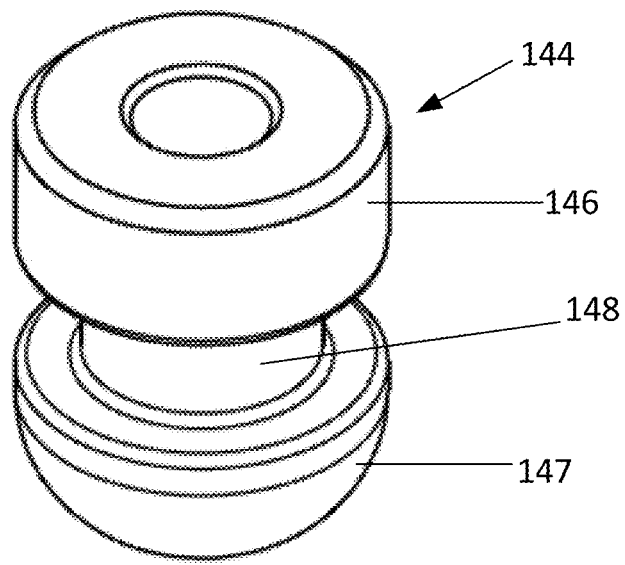
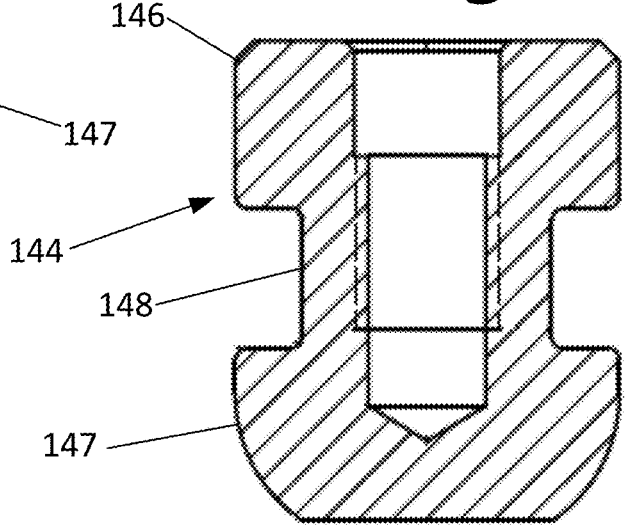
Fig. 34
Fig. 35

Fig. 36
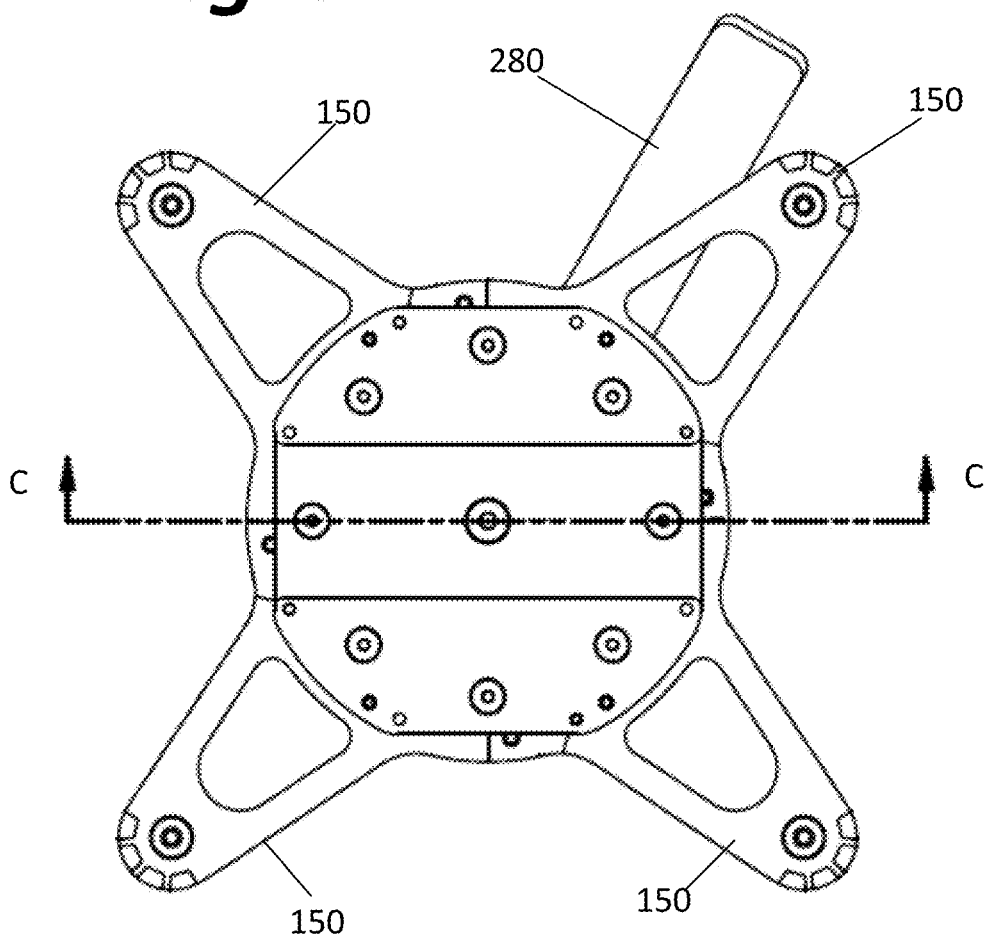
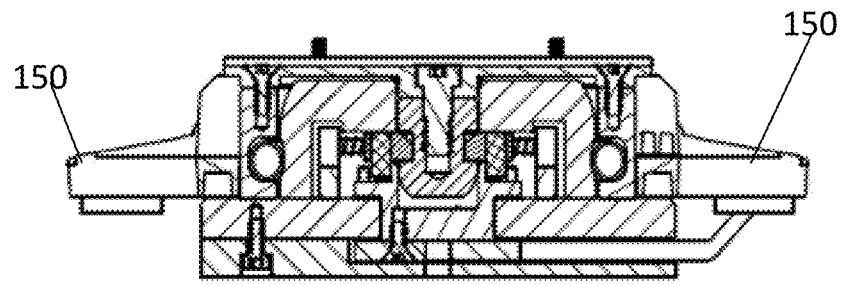
Fig. 37

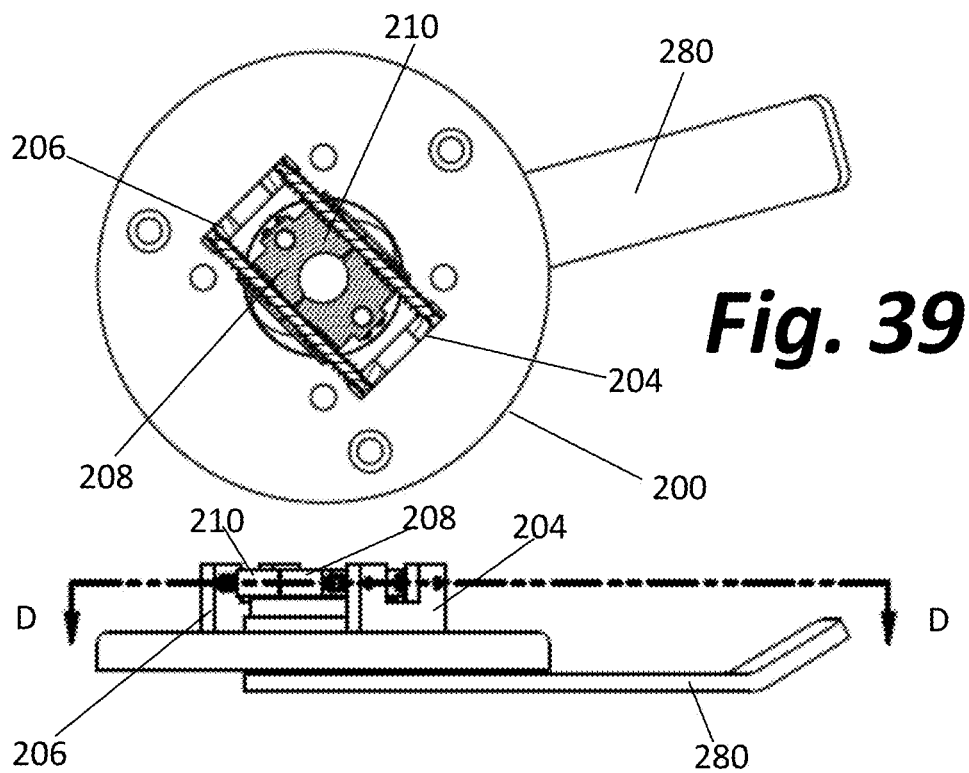
Fig. 39
Fig. 38
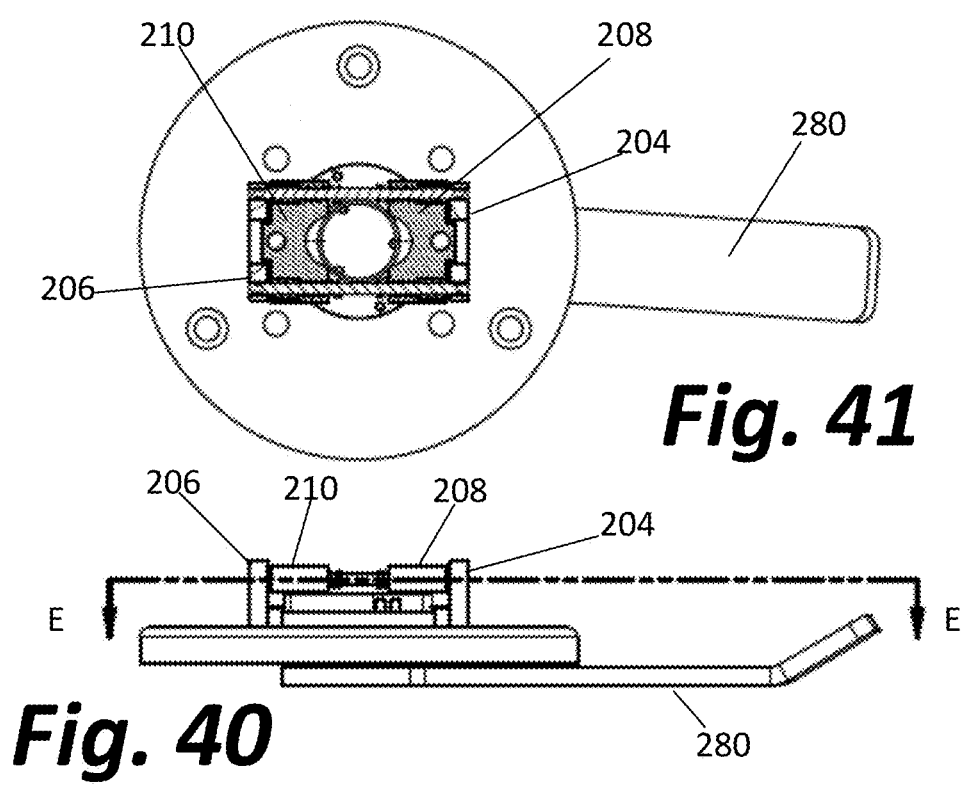
Fig. 41
Fig. 40

MOUNTING ASSEMBLY

CROSS-REFERENCED TO RELATED APPLICATIONS

This application is a continuation-in-part of Ser. No. 16/804,692, filed Feb. 28, 2020, which is deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

The present invention relates to equipment mounting systems, and more specifically systems for mounting medical equipment to a horizontal surface of a transport vehicle such as a cart or ambulance.

II. Discussion of the Prior Art

Any time equipment is transported via a transport vehicle precautions must be taken to secure the equipment. This is necessary to prevent damage to the equipment and to prevent the equipment from falling and causing injury.

Medical equipment such as ultrasound equipment, patient monitors and cardiac defibrillators are quite heavy and very expensive. Various mounting systems have been developed for mounting such a equipment to a vehicle, but these are not universal mounts and typically must be specifically adapted to accommodate the specific type of equipment, the specific type of vehicle, and the specific location of the vehicle where the equipment is to be mounted. These mounts make it difficult to reposition the equipment relative to the vehicle and the mounts typically must be reconfigured or adjusted to accommodate any such repositioning.

A need therefore exists for universal mounting systems that address each of the problems discussed above.

SUMMARY OF THE INVENTION

The foregoing problems are solved, at least with respect to mounting equipment to horizontal surfaces, by providing a universal mounting system comprising a latch post assembly adapted to be secured to a horizontal surface and be coupled to a receiver assembly adapted to be secured to the bottom of a piece of equipment.

The latch post assembly comprises a base plate and a post. The base plate has a first center section and a first outer section. The first center section may be recessed relative first outer section. The post projects from the top surface of the base plate at the first center section of the base plate. The post includes a side wall terminating in a flat top surface. The sidewall includes a concave surface extending around the post intermediate of the base plate and the flat top surface. The post also has a central channel open at the flat top surface. The first outer section of the base plate is adapted to enable the latch post assembly to be mounted to a horizontal surface. For example, there may be a series of screw holes associated with the outer section of the base plate so that the base plate may be bolted or screwed to a horizontal surface at any selected position along the horizontal surface.

The receiver assembly comprises an interface plate, a ring, a pin, and a spring. The interface plate has a second center section, an intermediate section and a second outer section. The pin projects in a first direction from second center section of the interface plate. The ring is positioned concentric with the pin and projects in the same direction as the pin from the intermediate section of the interface plate. The ring has an interior spring receiving zone. The spring is positioned within the interior spring receiving zone. The second outer section of the interface plate is adapted to enable the receiver assembly to be mounted to a piece of equipment. In some embodiments the receiver assembly may also have a plurality of support legs extending outwardly from the ring.

With the latch post assembly mounted to the horizontal surface, and the receiver assembly mounted to a piece of equipment, the latch post assembly and the receiver assembly are coupled together. More specifically, the latch post assembly and the receiver assembly are adapted to be coupled together so that the pin is received within the central channel of the post, the post is received within the ring and the spring is positioned within concave surface extending around the post and the interior spring receiving zone of the ring.

When multiple latch post assemblies are mounted to the horizontal surface(s) of a vehicle, the equipment can be quickly and easily repositioned by mating the receiver assembly attached to the equipment with a different selected latch post assembly. No tools are required to do so.

When the receiver assembly is mounted to a latch post assembly, various spring forces prevent these assemblies from becoming inadvertently decoupled. These forces provided by the spring compressed within the spring receiving zone of the ring between the circumferential surface inside the ring's spring receiving zone and the concave surface on the side wall of the post. The angled sections of the concave surface on the side wall of the post retain the receiver assembly by providing constant spring deflection with an increase in deflection and associated external vertical force required to disengage the latch mechanism and release the receiver assembly and attached equipment from the post assembly.

Further, the receiver assembly and a latch post assembly allow the equipment to be rotated to a desired viewing angle related to the horizontal surface. Frictional forces between the compressed spring and the vertical post in addition to the contact surface between the bottom face of the ring and the top surface of the mounting baseplate sufficiently prevent unintended rotation during use. When the legs are provided, they can include pads that allow the equipment to be put down on other intermediate work surface like the group or another table or work surface. The pads provide a sturdy support for the device which dampens vibration and resists sliding on wet or slippery surfaces.

The universal mount may also include a secondary latch mechanism to provide a more secure connection between a surface and a device mounted to the surface using the universal mount. This secondary latch mechanism comprises a bi-lateral latch assembly, cam and handle for actuating the cam to open and close the latches of the bilateral latch assembly as a part of the latch post assembly, and a modified pin of the receiver assembly adapted to be engaged by the latches of the bilateral latch assembly.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts:

FIG. 25 is a cross-sectional view of the post of the latch post assembly.

FIG. 26 is an exploded perspective view of one of the latches of the bi-lateral latch assembly, the other latch member of the bi-lateral latch assembly being the mirror image thereof.

FIG. 27 is a perspective view of the latch of FIG. 26.

FIG. 28 is a perspective view showing the bottom of the latch of FIG. 26.

FIG. 33 is a perspective view of the pin of receiver assembly of FIG. 32.

FIG. 34 is a side view of the pin of FIG. 33.

FIG. 35 is a cross-sectional view of the pin through line B-B in FIG. 34.

FIG. 36 is a top plan view of the universal mount of FIG. 18.

FIG. 37 is a cross-sectional view through line C-C in FIG. 36.

FIG. 38 is a side view of the latch mechanism of FIG. 22 with the latch mechanism in the latched condition.

FIG. 39 is a cross-sectional view through line D-D in FIG. 38.

FIG. 40 is a side view of the latch mechanism of FIG. 22 with the latch mechanism in the unlatched condition.

FIG. 41 is a cross-sectional view through line E-E in FIG. 40.

DESCRIPTION OF THE PREFERRED EMBODIMENT

Figure 1:
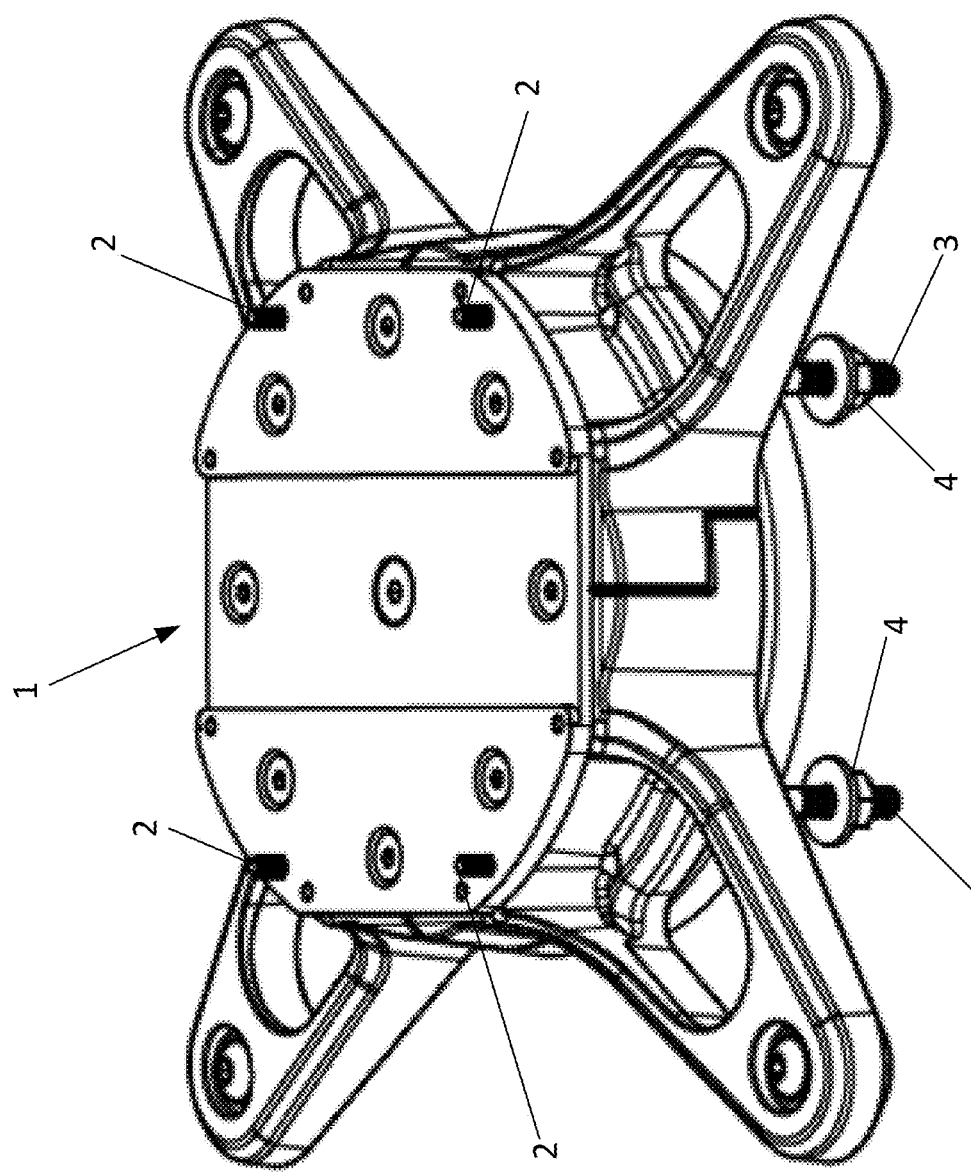
FIG. 1 is a perspective view of a universal mount made in accordance with the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

The drawings show an illustrative embodiment of a mounting assembly used to mount a piece of equipment (not shown) to a horizontal surface (not shown). The piece of equipment could, for example, be a defibrillator and the horizontal surface could be that of a cart, table or shelf such a those found in an ambulance or emergency medical services vehicle. The screws 2 shown in FIG. 1 are used to couple the mounting assembly 1 to the piece of equipment while the bolts 3 and nuts 4 are used to couple the mounting assembly 1 to the horizontal surface.

Figure 2:
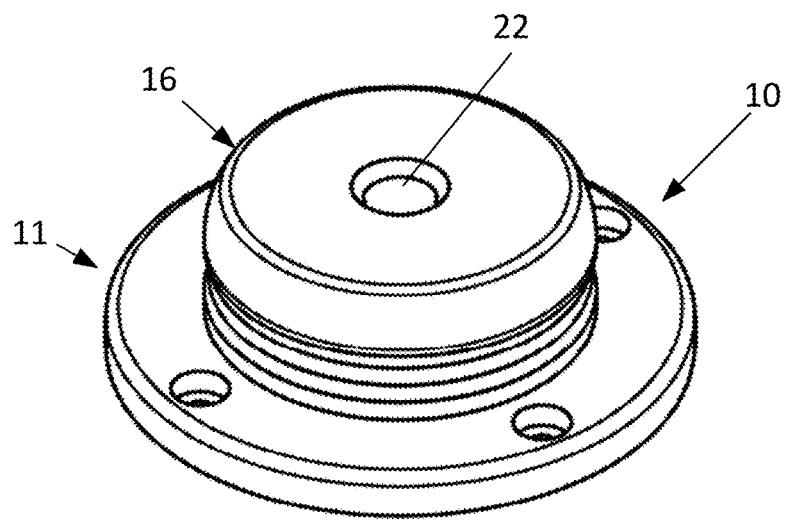
FIG. 2 is a perspective view of a latch post assembly of the universal mount of FIG. 1.
Figure 3:
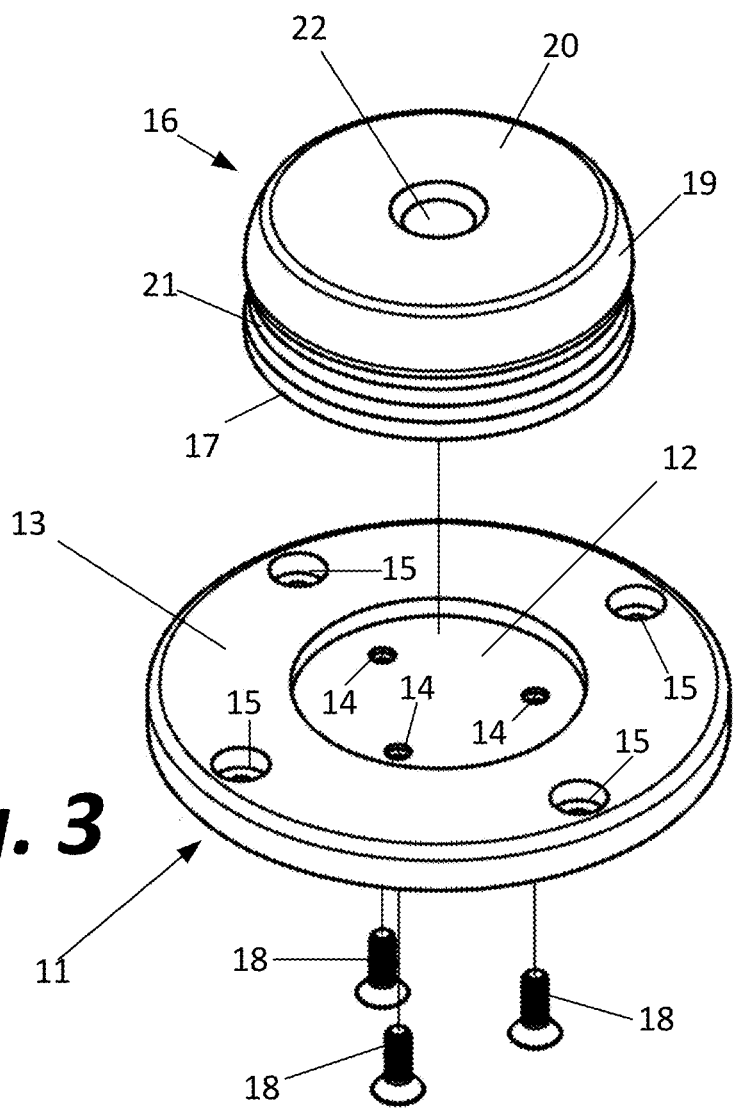
FIG. 3 is a perspective exploded view of the latch post assembly of FIG. 2.
Figure 14:
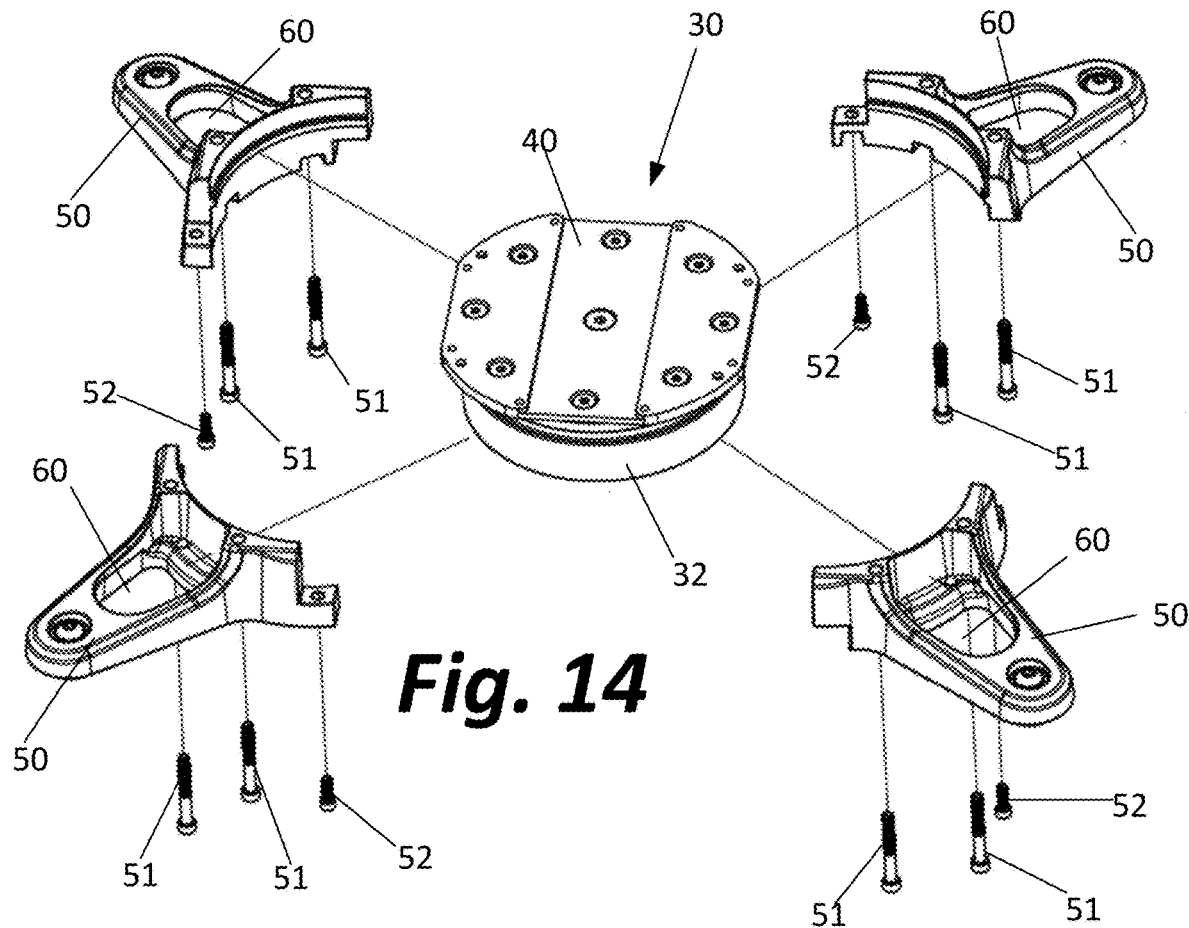
FIG. 14 is a perspective partially exploded view of the receiver assembly of the universal mount of FIG. 1.
Figure 15:
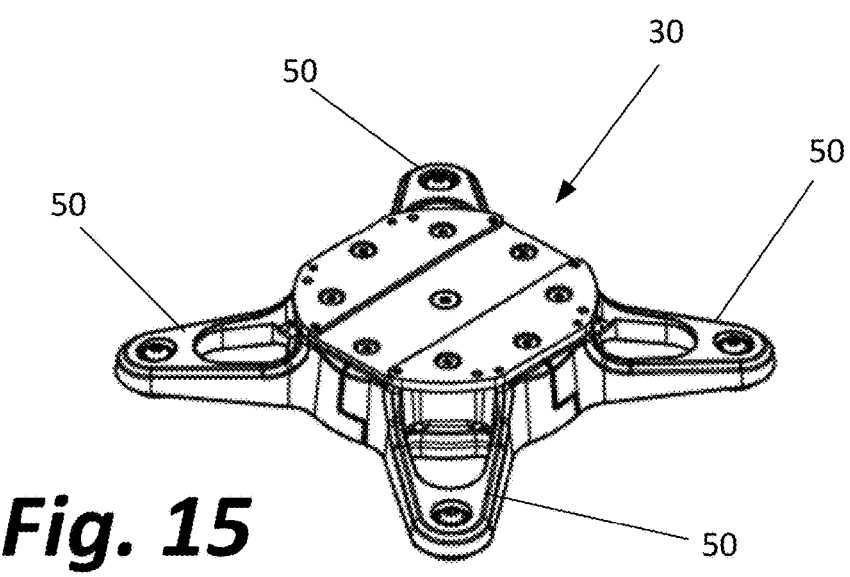
FIG. 15 is a perspective view of the receiver assembly of the universal mount of FIG. 1.

The mounting assembly 1 comprises two primary subassemblies, specifically a latch post assembly 10, shown in FIG. 2, adapted to be coupled to the horizontal surface by the bolts 3 and nuts 4 and a receiver assembly 30, shown in FIGS. 14 and 15, adapted to be coupled to a piece of equipment by the screws 2.

The latch post assembly 10 is best shown in FIGS. 2-6. The latch post assembly 10 comprises a base plate 11 having a recessed center section 12 and an outer section 13. The recessed center section 12 has three screw holes 14. The outer section has four screw holes 15.

The latch post assembly 10 further comprises a post 16. The post 16 has a bottom portion 17 adapted to be received within the recessed center section 12 of the base plate 11. When so positioned, threaded holes (not shown) in the bottom portion 17 of the post 16 are aligned with the holes 14 and screws 18 are then used to connect the post 16 to the base plate 11. The post 16 also has a side wall 19 terminating in a flat top surface 20.

Figure 4:
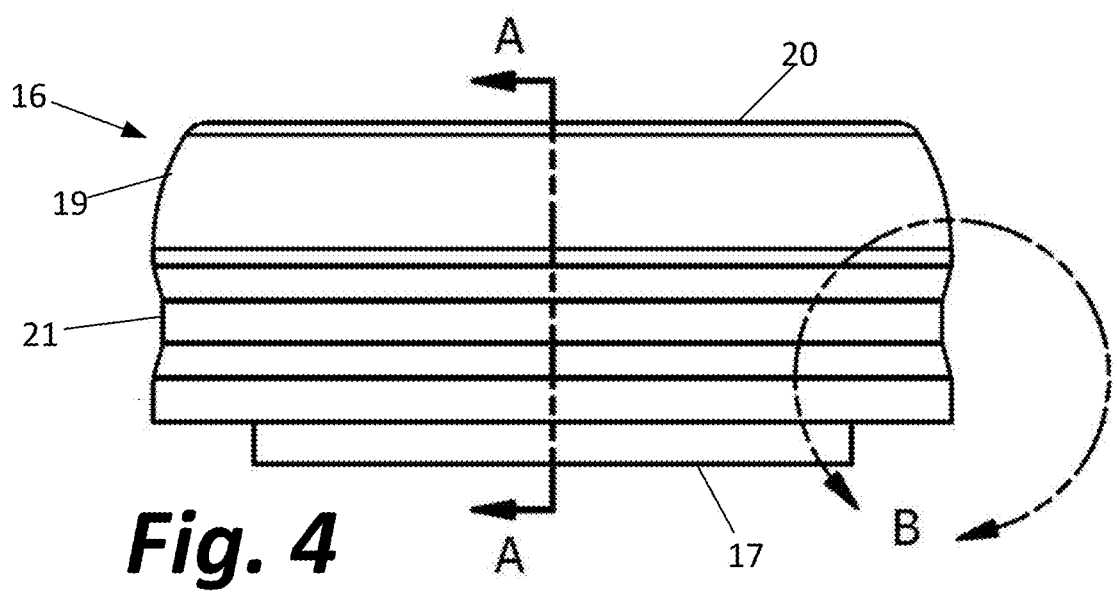
FIG. 4 is a plan view of the post of the latch post assembly of FIG. 2.
Figure 5:
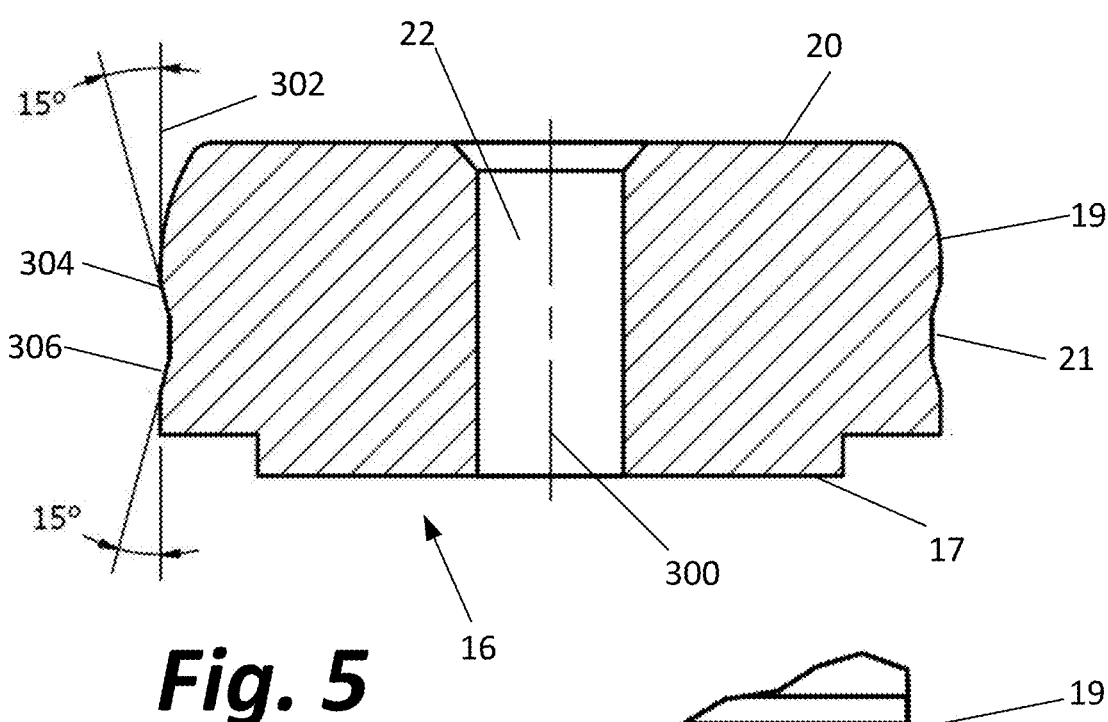
FIG. 5 is a cross-sectional view of the latch post of FIG. 4 taken through line A-A in FIG. 4.
Figure 6:
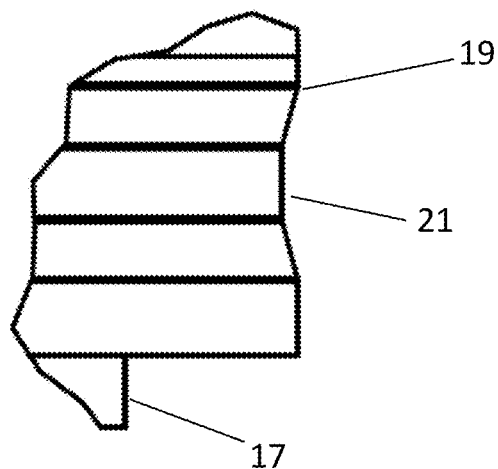
FIG. 6 is a detailed view of that portion of the posted of FIG. 4 labeled "B" in FIG. 4.
Figure 7:
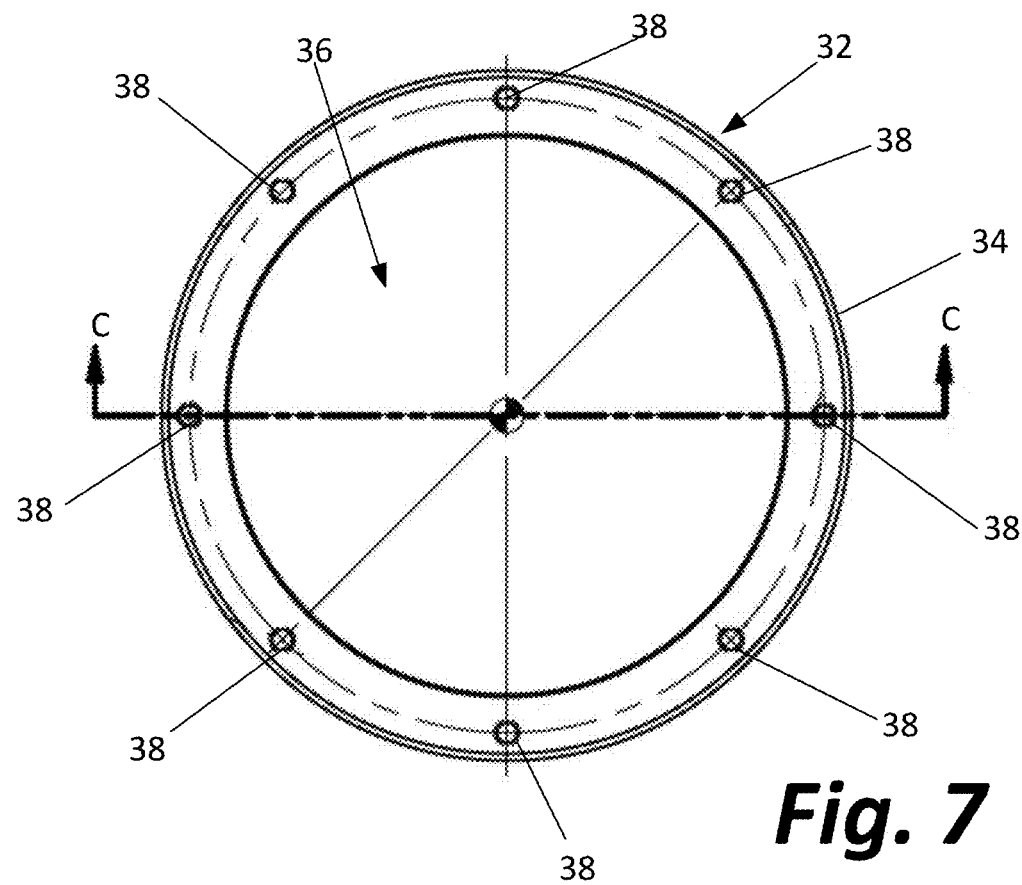
FIG. 7 is a top view of the ring of the receiver assembly of the universal mount of FIG. 1.
Figure 8:
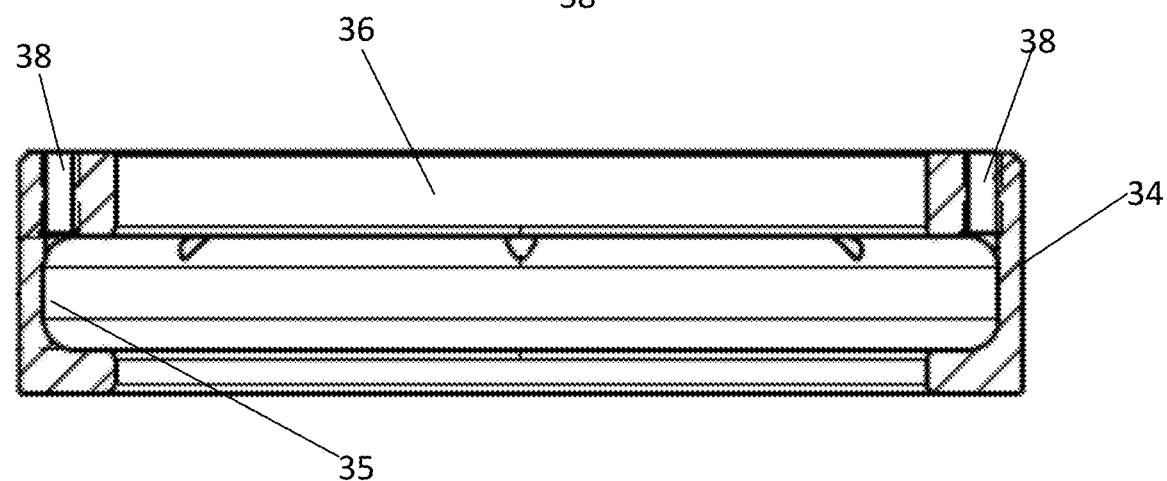
FIG. 8 is a cross-sectional view of the ring of the receiver assembly of FIG. 7 taken through line C-C in FIG. 7.
Figure 9:
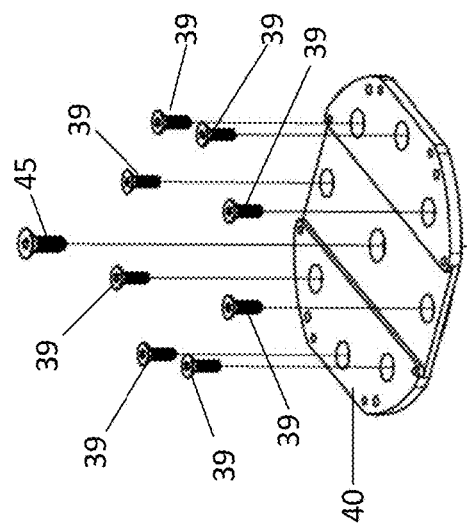
FIG. 9 is a front view of the pin of the receiver assembly of the universal mount of FIG. 1.
Figure 10:
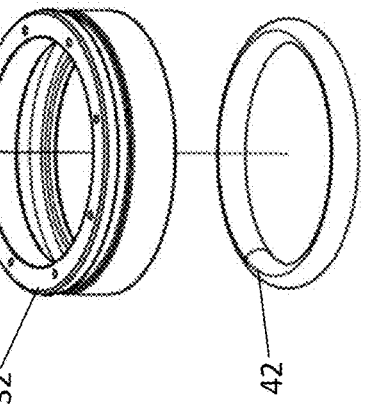
FIG. 10 is a cross-sectional view of the pin of FIG. 9 taken through line D-D in FIG. 9.
Figure 11:
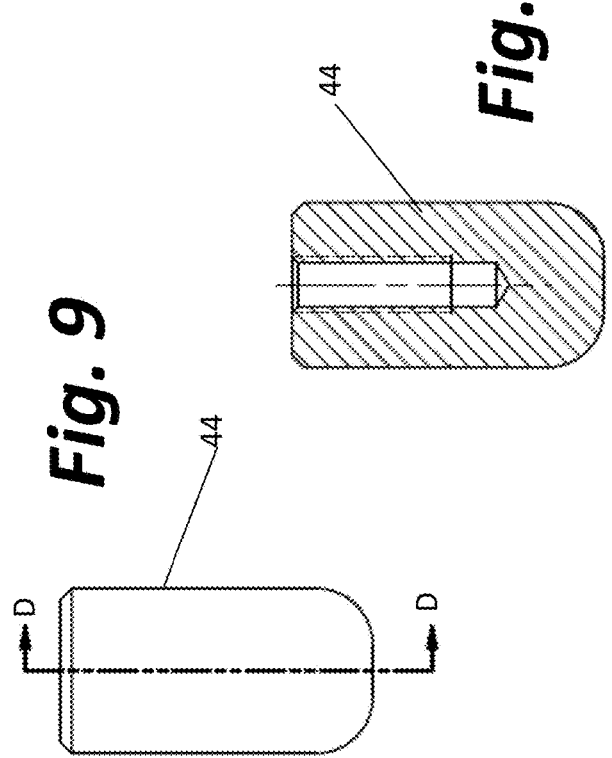
FIG. 11 is a top view of the spring of the receiver assembly of the universal mount of FIG. 1.
Figure 12:
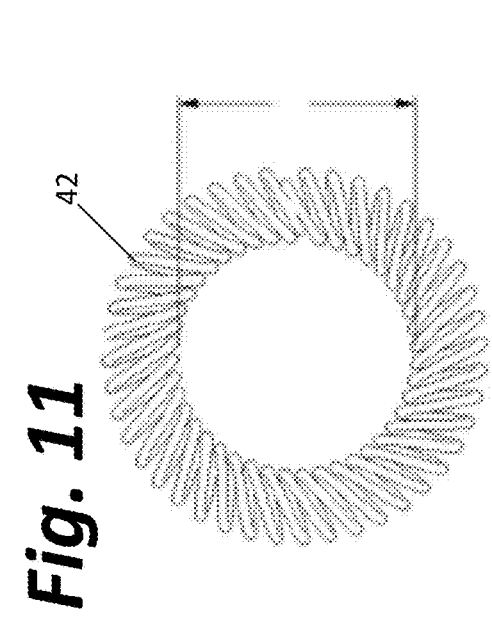
FIG. 12 is a side view of the spring of the receiver assembly of the universal mount of FIG. 1.
Figure 13:
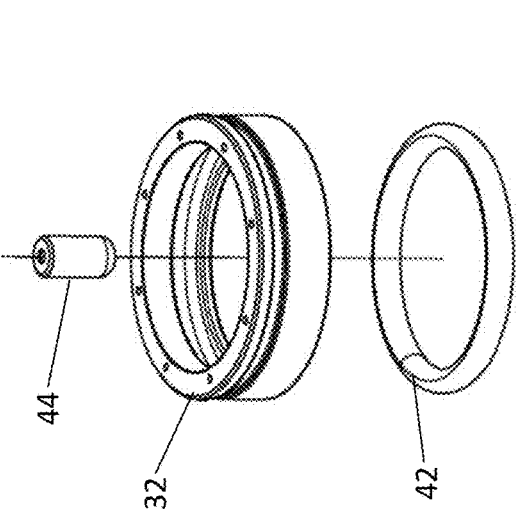
FIG. 13 is a perspective exploded view of the receiver assembly of the universal mount of FIG. 1.

As best shown in FIGS. 4-6, the side wall 19 has a concave channel 21 extending around the post 16 intermediate and parallel to the top surface 20 and bottom portion 17 of the post. This concave surface 21 extending around the post 16 comprises an angled top surface 304 and an angled bottom surface 306. The post 16 has a longitudinal central axis 300. The angled top surface 304 and the angled bottom surface 306 each extend from a line 302 that is parallel to the longitudinal central axis 300 at an angle of 15 degrees.

The post 16 also has a central channel 22 open at the flat top surface 20.

When the mounting assembly 1 is used, the post 16 is first coupled to the base plate 11 as described above. The latch post assembly 11 is then coupled to the horizontal surface by aligning the holes 15 with corresponding holes in the horizontal surface, passing the bolts 3 through the aligned holes and then applying the nuts 4 to the bolts 3. Attachment means other than the nuts 4 and bolts 3 may be used without deviating from the invention.

The receiver assembly 30 is illustrated in FIGS. 7-15. The receiver assembly includes ring 32, best shown in FIGS. 7 and 8. The ring 32 comprises a side wall 34 surrounding a central opening 36. The top surface of the side wall 34 of the ring 32 has a plurality of spaced-apart screw holes 38. The screw holes 38 receive screws 39 to attach an interface plate 40 to the ring 32. The side wall 34 includes an interior spring receiving zone 35 adapted to receive and retain a spring 42.

The receiver assembly 30 also includes a pin 44. The pin 44 is mounted to the center of the interface plate 40 via screw 45 such that the pin 44 and ring 32 are concentric to each other and project in the same direction from the interface plate 40.

Figure 16:
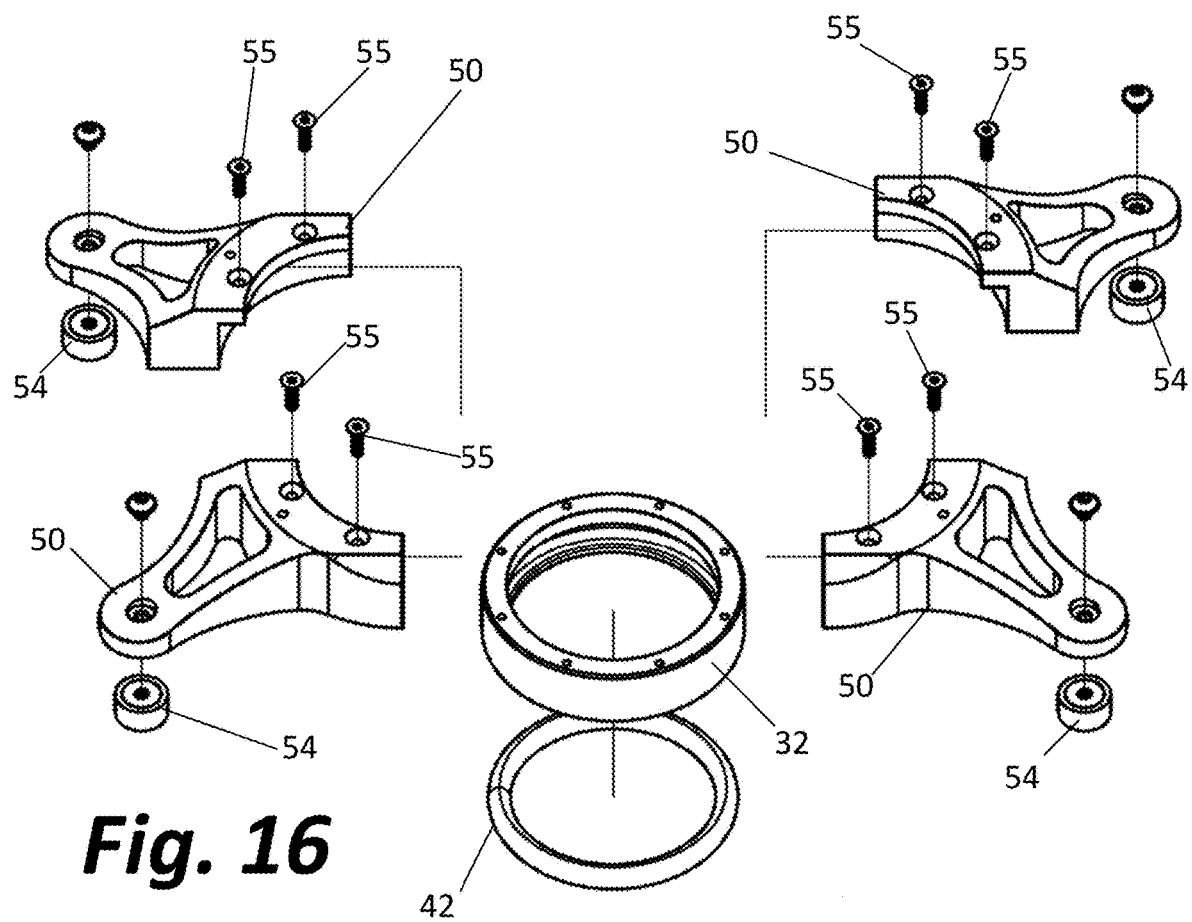
FIG. 16 is a perspective exploded view of an alternative receiver assembly.
Figure 17:
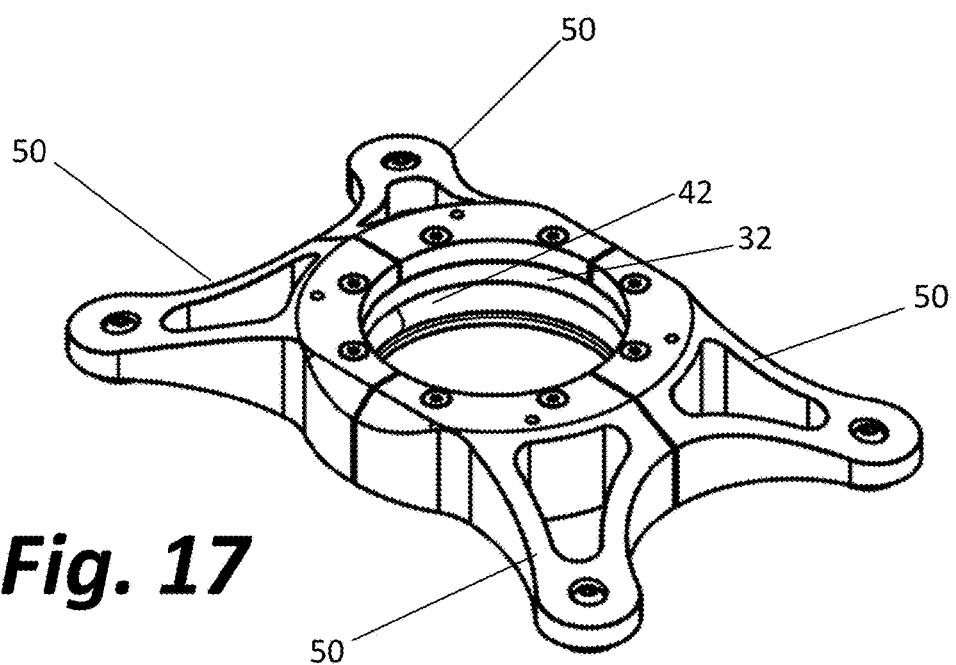
FIG. 17 is a perspective view of the receiver assembly of the universal mount of FIG. 1.
Figure 18:
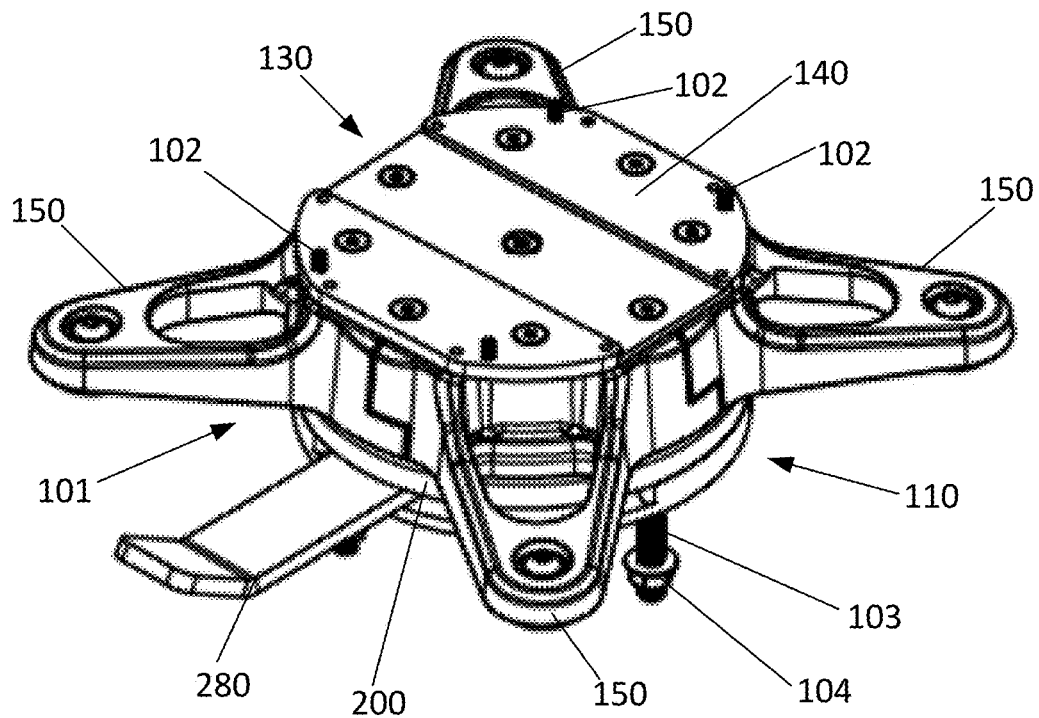
FIG. 18 is a perspective view of an alternative embodiment of a universal mount.
Figure 19:
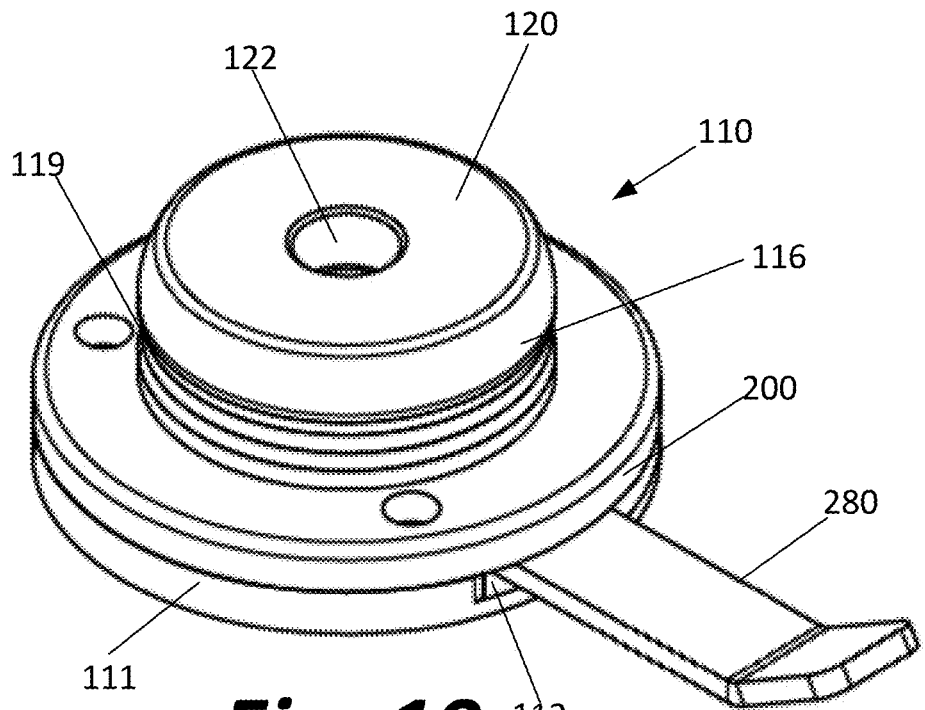
FIG. 19 is a perspective view of a latch post assembly of the universal mount of FIG. 18.
Figure 20:
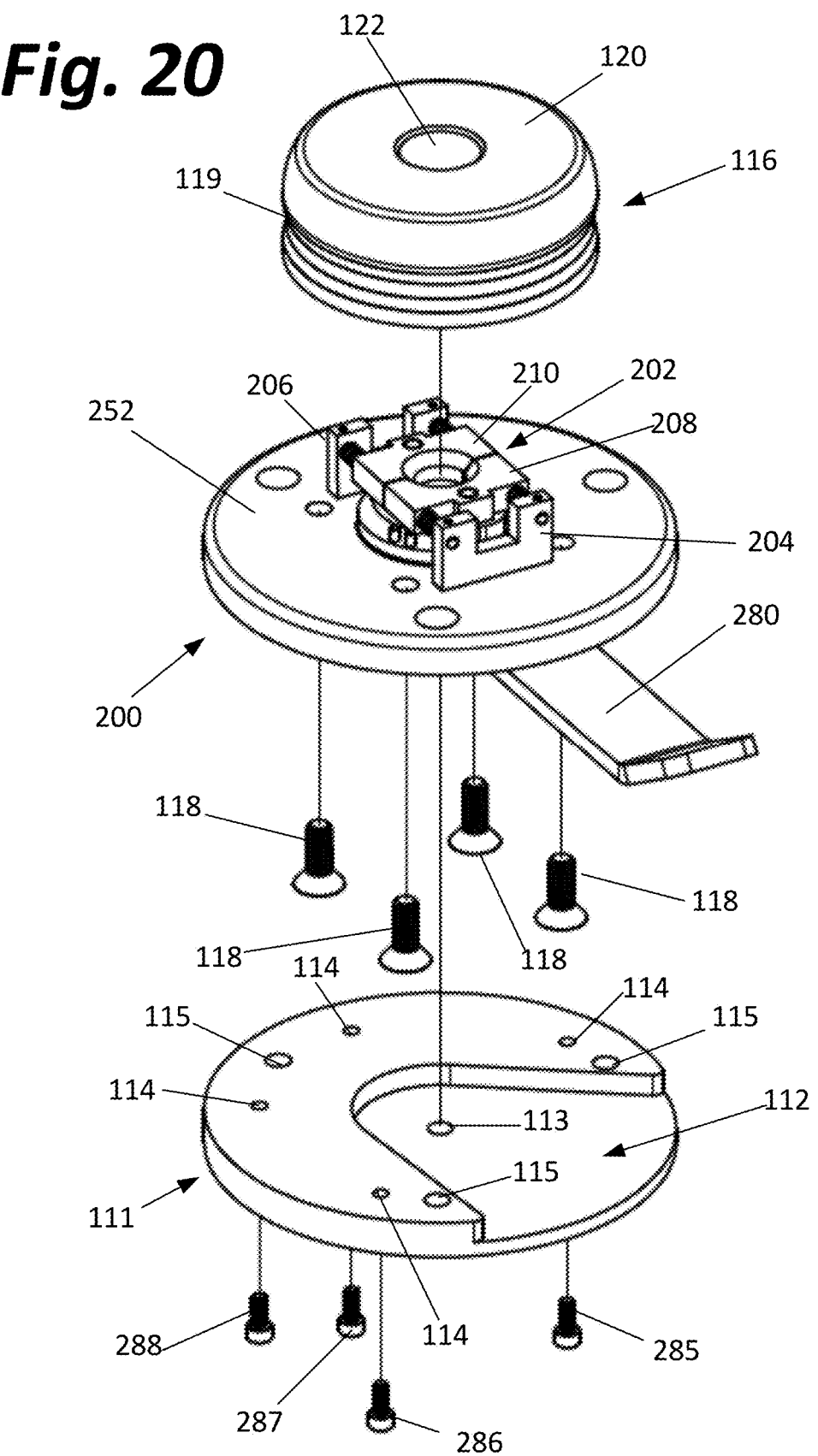
FIG. 20 is a perspective partially exploded view of the latch post assembly of FIG. 19.
Figure 21:
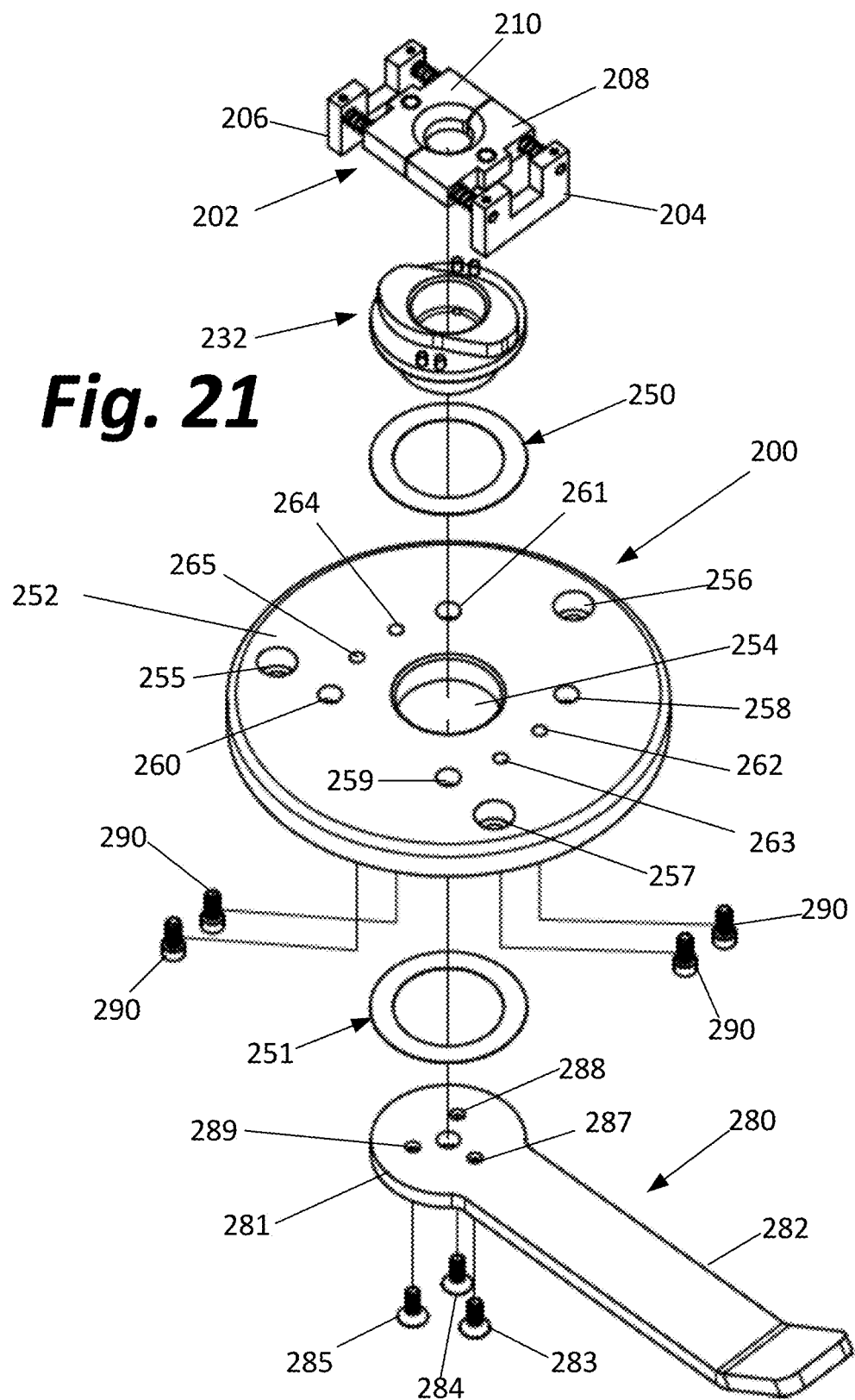
FIG. 21 is a perspective exploded view of the latch mechanism of the latch post assembly of FIG. 19.
Figure 22:
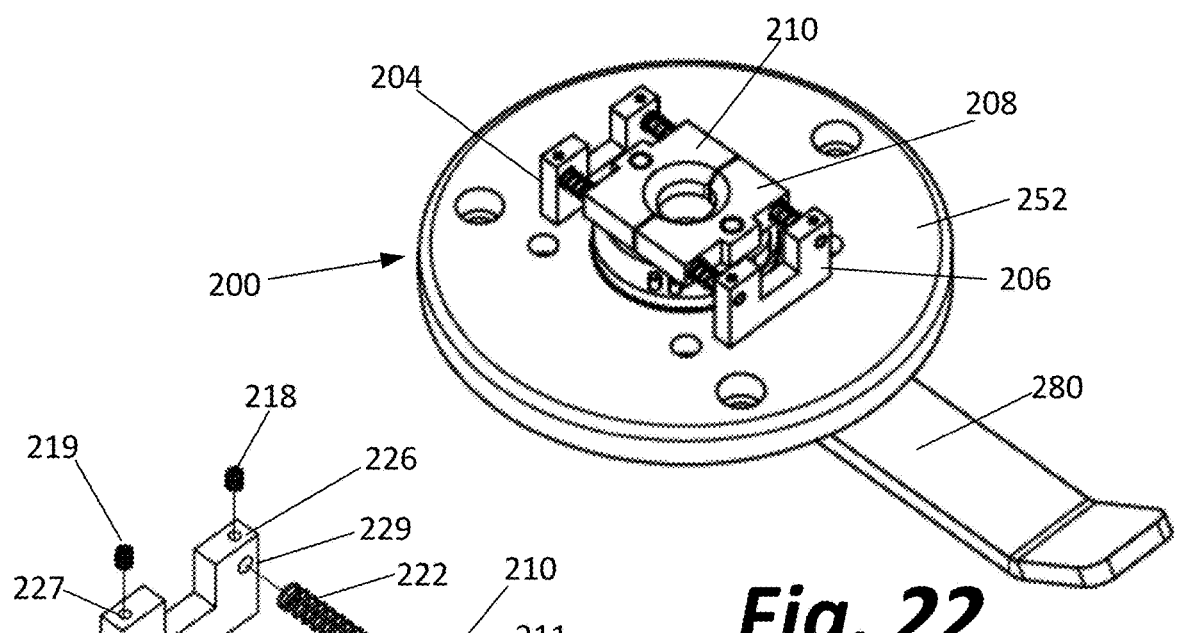
FIG. 22 is a perspective view of the latch mechanism of FIG. 21.
Figure 23:
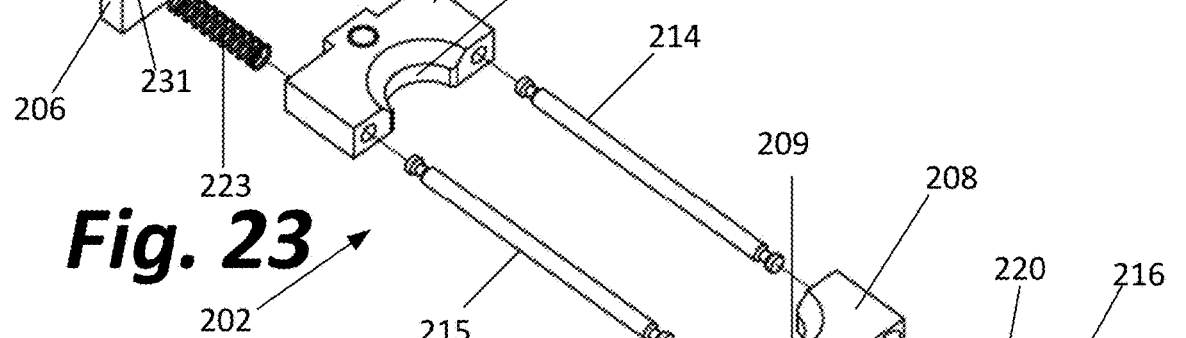
FIG. 23 is a perspective exploded view of the bilateral latch of the latch mechanism of FIG. 21.
Figure 24:
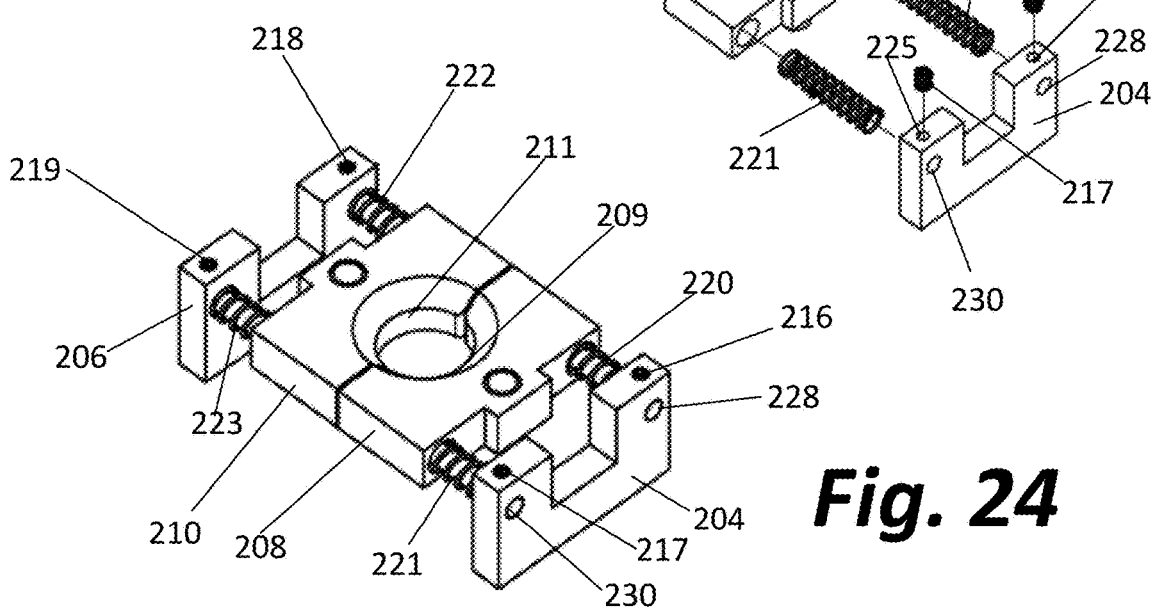
FIG. 24 is a perspective view of the bilateral latch of FIG. 23 assembled.
Figure 29:
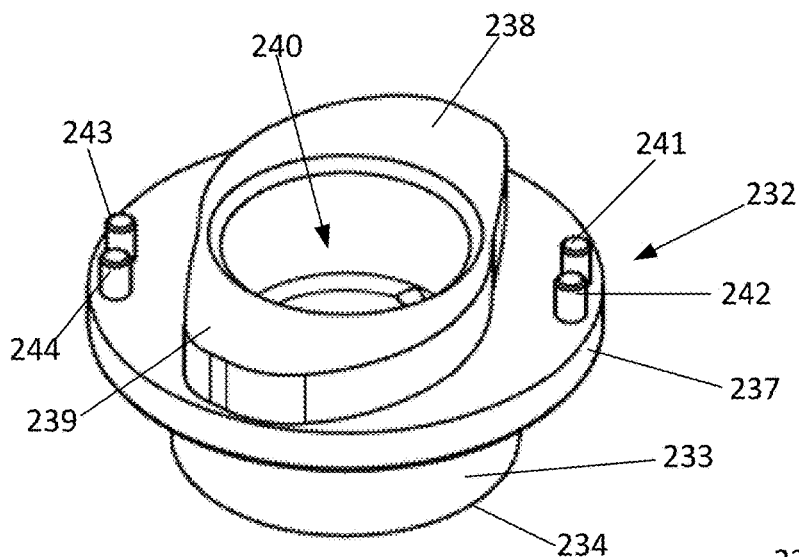
FIG. 29 is a perspective view of the cam member of the latch mechanism of FIG. 21.
Figure 30:
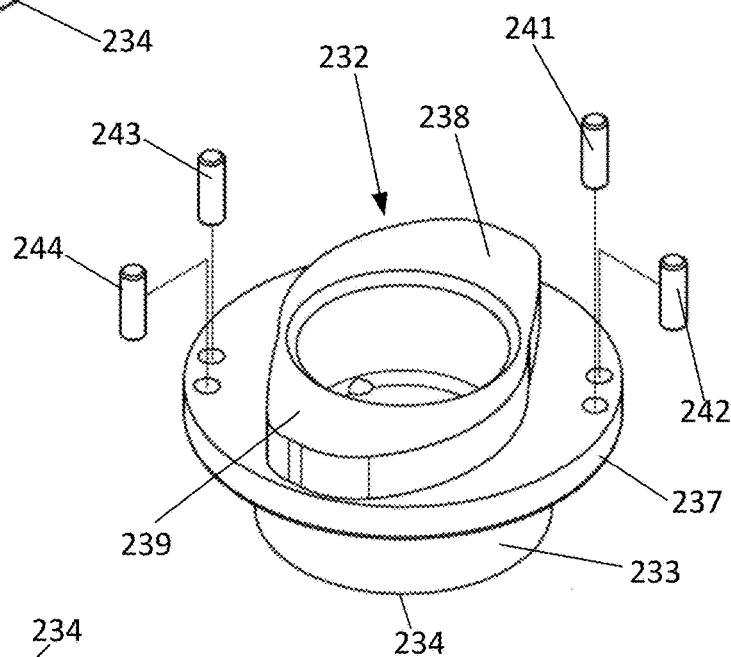
FIG. 30 is a perspective exploded view of the cam member of FIG. 29.
Figure 31:
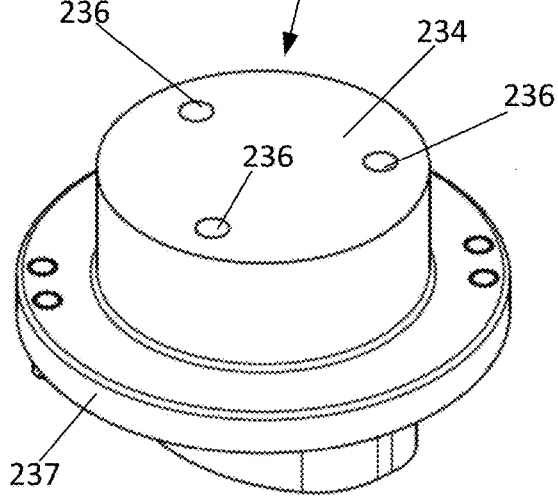
FIG. 31 is another perspective view of the cam member of FIG. 29 showing the bottom of the cam member.
Figure 32:
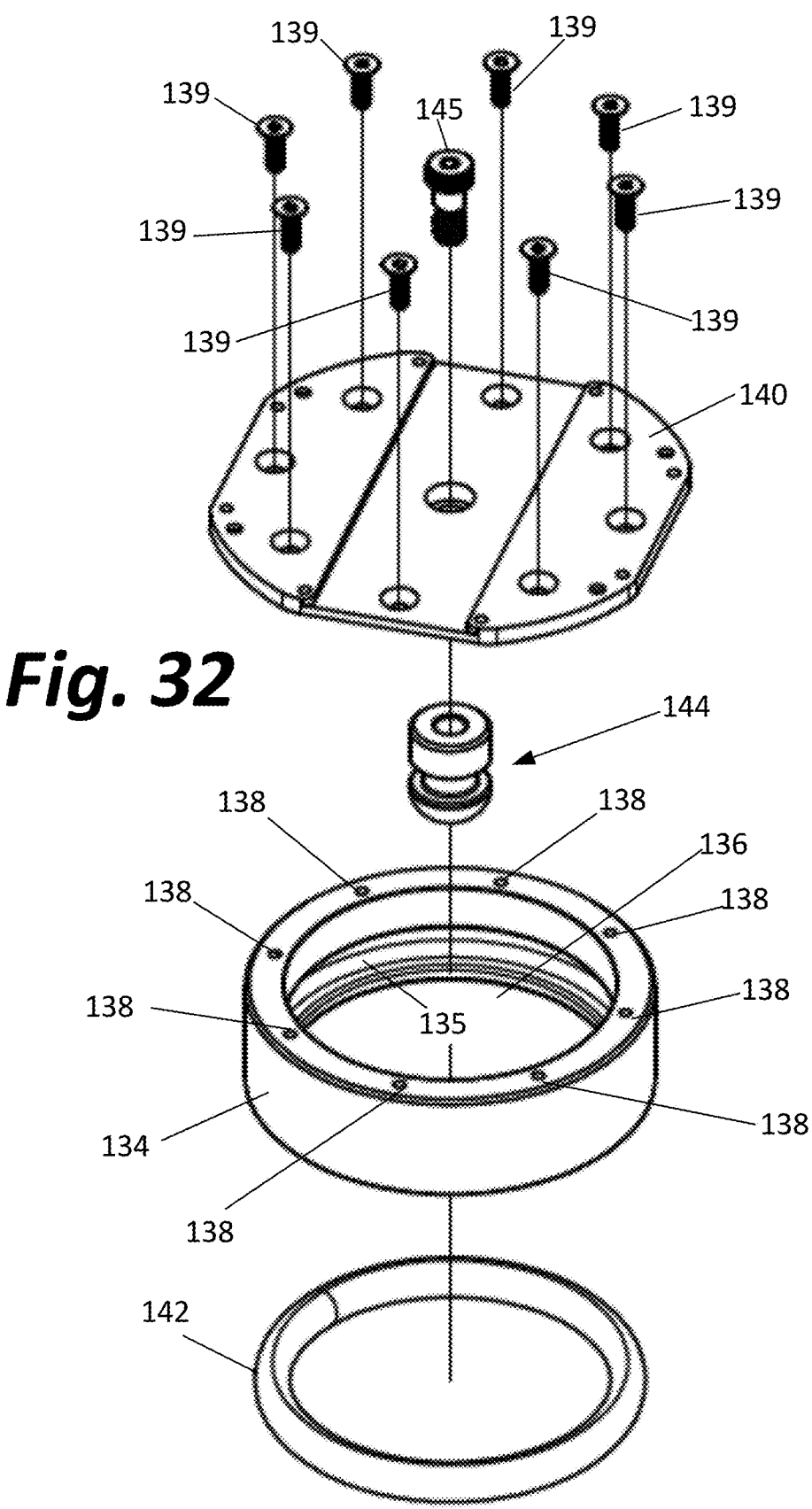
FIG. 32 is a perspective exploded view of the receiver assembly of the universal mount of FIG. 18.

The receiver assembly 30 also includes four legs 50 projecting from the ring 32. The legs 50 may either be bolted directly to the ring 32, as shown in FIGS. 16 and 17, or to the interface plate, as shown in FIGS. 14 and 15 using bolts 51. In some embodiments a bolt 52 connects adjacent legs 50. A depending foot 54 may be attached to each leg 50. The legs 50 each have openings 60 to allow access to the screws 2 so that the receiver assembly may be easily attached to the bottom of a piece of equipment such as a defibrillator.

With the receiver assembly 30 attached to a device and the latch post assembly 10 attached to a horizontal surface, the mounting assembly 1 can be used to fix the device in place on the horizontal surface. Specifically, the ring 32 is positioned over the post 16 with the pin 44 centered over the central channel 22 of the post 16. The device is then lowered into place. As this occurs, the pin 44 enters the central channel 22 of the post 16 and the post 16 enters the ring 32. When the assembly is complete, the spring 42 resides within the concave channel 21 of the side wall 19 of the post 16 and the spring receiving zone 35 of the ring 32. The spring is slightly compressed to provide a holding force sufficient to couple together the latch post assembly 10 and the receiver assembly 30.

As noted above, the channel 21 has an angled top surface 304 and the angled bottom surface 306 each extend from a line 302 that is parallel to the longitudinal central axis 300 at an angle of 15 degrees. Other angles any be used without deviating from the invention. The angle that is chosen will, of course, impact the installation/holding/removal force.

One advantage of the embodiment shown is that the receiver assembly 30 can swivel about the post 16 by a user applying a rotational force. When this force is removed, frictional forces between the spring 42 and post 16 inhibit further rotation.

FIGS. 18 through 41 disclose an alternative embodiment of the present invention incorporating additional latching features. As illustrated, the mounting assembly 101 again comprises two primary subassemblies, specifically a latch post assembly 110, shown in FIGS. 19 through 31, adapted to be coupled to the horizontal surface by the bolts 103 and nuts 104 and a receiver assembly 130, shown in FIGS. 32 through 35, adapted to be coupled to a piece of equipment by the screws 102.

The latch post assembly 110 comprises a base plate 111 having a recessed angular section 112 extending inwardly from the periphery of the base plate 111 past the center of the base plate 111 and a raised section. The recessed angular section 112 has a screw hole 113 that extends through the center of base plate 111. The raise section has two sets of screw holes. The screw holes of the first set are labeled 114 and the screw holes of the second set are labeled 115.

The latch post assembly 110 further comprises a post 116. The post 116 has a bottom portion 117 with threaded holes (not shown). The post 116 also has a side wall 119 terminating in a flat top surface 120. As shown in FIG. 25, and similar to what is shown in FIGS. 4-6, the side wall 119 has a concave channel 121 extending around the post 116 intermediate and parallel to the top surface 120 and bottom portion 117 of the post. This concave surface 121 extending around the post 116 also comprises an angled top surface 304 and an angled bottom surface 306 like post 16. The post 116 also has a central channel 122 open at the flat top surface 120 and at the bottom portion 117. This channel 122 has a substantially wider diameter at the bottom portion 117 than at the top surface 120.

Mounted between the post 116 and the base pate 111 is an internal latch mechanism 200. The internal latch mechanism 200 includes a bilateral latch assembly 202 adapted to fit within the wider diameter portion of the central channel 122 associated with the bottom portion of post 116. This bilateral latch assembly 202 comprises opposed bearing walls 204 and 206. Extending between the oppose bearing walls 204 and 206 are a pair of latch rails 214 and 215. Opposite ends of these rails are received within rail holes 228, 229, 230, and in the bearing walls 204 and 206. As should be clear from FIG. 23, one end of latch rail 214 is inserted into rail hole 228 in bearing wall 204 and the other end of latch rail 214 is inserted into rail hole 229 of bearing wall 206. Similarly, one end of latch rail 215 is inserted into rail hole 230 in bearing wall 204 and the other end of latch rail 215 is inserted into rail hole 231 of bearing wall 206.

The internal latch mechanism 200 further comprises latch members 208 and 210. Latch member 208 has a concave recess 209 and latch member 210 has a concave recess 211. The latch members 208 and 210 are mounted for reciprocal movement on the latch rails 214 and 215 with the concave recesses 209 and 211 facing toward each other. Also mounted on the latch rails 214 and 215 are springs 220, 221, 222, and 223. Spring 220 surrounds latch rail 214 in the region between latch bearing wall 204 and latch member 208. Spring 221 surrounds latch rail 215 in the region between latch bearing wall 204 and latch member 208. These springs 220 and 221 provide a spring force that biases latch member 208 toward latch member 210. Likewise, spring 222 surrounds latch rail 214 in the region between latch bearing wall 206 and latch member 210, and spring 223 surrounds latch rail 215 in the region between latch bearing wall 206 and latch member 210. Springs 222 and 223 provide a spring force that biases latch member 210 toward latch member 208. Set screws 216, 217, 218, and 219 are inserted into set screw holes 224, 225, 226, and 227 to fix the ends of the latch rails 214 and 215 within the rail holes 228, 229, 230, 231 of bearing walls 204 and 206.

The internal latch mechanism 200 further comprises a cam 232 that is operated to either overcome the spring force of the springs 220, 221, 222 and 223 to separate the latch members 208 and 210 from their latched condition (see FIGS. 40 and 41) or permit the latch members 208 and 210 to be returned to the latched condition by the force of springs 220, 221, 222 and 223 (see FIGS. 38 and 39).

The cam 232 comprises a bottom cylindrical section 233 terminating in a bottom surface 234. Extending through the bottom surface are three threaded screw holes 236. Extending outwardly from the top of the bottom cylindrical section of the cam 232 is a center wall section 237. Located above the outwardly extending center wall section of the cam 232 are a pair of radially extending cam elements 238 and 239 having cam surfaces adapted to engage the latch members 208 and 210. The cam 232 further includes two pairs of engagement pins 241 and 242, and 243 and 244 adapted to be received within engagement pin receiving sockets in the top surface of the outwardly extending center wall section. One of these pairs of engagement pins (241/242) resides on a first side of the radially projecting camming elements (238/239) and the other of these pairs of engagement pins (243/244) resided on a second side of the radially projecting camming elements 238 and 239. A large central opening 240 extends inwardly from the top of cam 232.

The internal latch mechanism 200 comprises at least four additional elements, namely a first bearing ring 250, a mounting plate 252, a second bearing ring 251 and an actuator handle 280. The mounting plate 252 has a center opening 254, outer mounting holes 255, 256 and 257, inner mounting holes 258, 259, 260 and 261, and bearing wall mounting holes 262, 263, 264, and 265. The actuator handle 280 comprises a rounded section 281 and an elongate section 282 projecting from the rounded section 281. The rounded section 281 has a central opening and three peripheral openings 287, 288, and 289.

The internal latch mechanism is assembled as follows. First, the bilateral latch assembly 202 is formed by (a) sliding the two latch members 208 and 210 on to the latch rails 214 and 215 (i.e., inserting the rails through the channels 292 extending through the latch members 208 and 210) so that the latch recesses 209 and 211 face each other, (b) inserting the latch rails 214 and 215 through the springs 220, 221, 222 and 223, (c) inserting the ends of the latch rails 214 and 215 into the rail holes 228, 229, 230 and 231 of the bearing walls 204 and 206, and (d) locking the ends of the latch rails 214 and 215 in place by inserting and tightening the set screws 216, 217, 218 and 219 in the set screw holes 224, 225, 226, and 227.

After construction of the bilateral latch assembly is completed, the bilateral latch assembly 202 is placed over the cam 232 and the bottom cylindrical section 233 of the cam 232 is inserted through bearing ring 250 and the center opening 254 of mounting plate 252. Bearing wall mounting screws 290 are then inserted through bearing wall mounting holes 262, 263, 264, and 265 into the bottom of the bearing walls 204 and 206 to couple the bilateral latch assembly 202 and the cam 232 to the mounting plate 252. When so assembled, the cam 232 is free to rotate provided enough force is applied to overcome the spring force of the springs 220, 221, 222, and 223 as applied to the radially projecting cam elements 238 and 239 via the latch members 208 and 210 and any further resistance provided by the pins 212 and 213 projecting downwardly from the latch members 208 and 210.

Assembly to the internal latch mechanism 200 is completed by positioning ring 251 on the bottom of cylindrical section 233 of the cam, then aligning the three peripheral openings 287, 288, and 289 through the rounded section 281 of the handle 280 with the threaded screw holes 236 in the bottom surface 234 of the cam, and coupling the handle 280 to the bottom surface 234 of the cam 232 using handle mounting screws 283, 284, and 285.

Once assembly of the internal latch mechanism 200 is completed, the latch post assembly 110 is constructed by inserting the bilateral latch assembly 202 into the chamber 301 of post 116 and inserting screws (not shown) through the holes 258, 259, 260, and 261 into the bottom portion of the post 116. After inserting bolts 103 downwardly through each of the bolt holes 115 in the base plate 111, the base plate 111 is coupled to the bilateral latch assembly with the actuator handle 280 residing in and projecting outwardly from the recessed angular section 112. Screws 285, 286, 287 and 288 are passed through the screw holes 114 in the base plate 111 to fasten the base plate 111 to the mounting plate 252 of the bilateral latch assembly. When so assembled, actuation of the handle 280 will serve to spread the latch members 208 and 209 toward their unlatched condition. Releasing the handle 280 will permit the springs 220, 221, 222 and 223 to return the latch members 208 and 209 to the latched condition.

When the mounting assembly 100 is used, the latch post assembly 110 is coupled to the horizontal surface by passing the bolts 103 through aligned holes in the horizontal surface and then applying the nuts 104 to the bolts 103. Attachment means other than the nuts 104 and bolts 103 may be used without deviating from the invention.

The receiver assembly 130 includes ring 132. The ring 132 comprises a side wall 134 surrounding a central opening 136. The top surface of the side wall 134 of the ring 132 has a plurality of spaced-apart screw holes 138. The screw holes 138 receive screws 139 to attach an interface plate 140 to the ring 132. The side wall 134 includes an interior spring receiving zone 135 adapted to receive and retain a spring 142.

The receiver assembly 130 also includes a pin 144. The pin 144 is mounted to the center of the interface plate 140 via screw 145 such that the pin 144 and ring 132 are concentric to each other and project in the same direction from the interface plate 140. As shown, the pin 144 has a fixed end, i.e., the end fixed to the plate 140 and a free end.

The pin 144 is adapted to cooperate with the latch members 208 and 210. More specifically, the pin 144 shown has a top section 146 adjacent the fixed end, a bottom section 147 adjacent the free end, and an intermediate section 148. The diameter of intermediate section 148 is less than the diameter of top section 146 and bottom section 147. More specifically, the pin 144 comprises a top section 146 having a first pin diameter, a bottom section 147 having a second pin diameter, and an intermediate section 148 having a third pin diameter less than the first and second pin diameters. As shown, the first and second pin diameters are equal in length. The first and second pin diameters may be the same or different without deviating from the invention. The diameter of intermediate section 148 corresponds to the diameter of the opening defined by the latch recesses 209 and 211 when the latch members 208 and 210 are in their latched condition. Thus, the top section 146 and bottom section 148 serve to prevent the pin 144 from dislodging from the internal latch mechanism 200 when the receiver assembly 130 and the latch post assembly 110 are matted together and the internal latch mechanism 200 is in the latch condition. When the handle 280 is actuated to move the latch members 208 and 210 to the unlatch condition, the latch members 208 and 210 are spread wide enough to permit decoupling of the pin 144 from the opening between the latch members 208 and 210.

More specifically, the first and second latch members 208 and 210 have recesses 209 and 211 facing each other. These recesses 209 and 211 form an opening having a first latch diameter when the first and second latch members 208 and 210 are in their latched position and a second latch diameter when the first and second latches 208 and 209 are in the unlatched position. The first latch diameter is the greatest distance between any point along the wall defining the first recess 209 and any point along the wall defining the second recess 211 when the latches 208 and 210 are in the latched position. The second latch diameter is the greatest distance between any point along the wall defining the first recess 209 and any point along the wall defining the second recess 211 when the latches 208 and 210 are in the unlatched position. From the drawings and the above description, one skilled in the art will recognize that the first latch diameter is greater than the third pin diameter and less than the first and second pin diameters, and the second latch diameter is greater than said first and second pin diameters.

As was the case with the other embodiments described above, the receiver assembly 130 also includes four legs 150 projecting from the ring 132. The legs 150 may either be bolted directly to the ring 132, as shown in FIGS. 16 and 17, or to the interface plate, as shown in FIGS. 14 and 15 using bolts 51. In some embodiments a bolt 52 connects adjacent legs 50. A depending foot 54 may be attached to each leg 50. The legs 50 each have openings 60 to allow access to the screws 2 so that the receiver assembly may be easily attached to the bottom of a piece of equipment such as a defibrillator.

With the receiver assembly 130 attached to a device and the latch post assembly 110 attached to a horizontal surface, the mounting assembly 100 can be used to fix the device in place on the horizontal surface. Specifically, the ring 132 is positioned over the post 116 with the pin 144 centered over the central channel 122 of the post 116. The latch is actuated to separate the latch members 208 and 210 and the device is then lowered into place. As this occurs, the pin 144 enters the central channel 122 of the post 116 and the post 116 enters the ring 132. When the assembly is complete, the spring 142 resides within the concave channel 121 of the side wall 119 of the post 116 and the spring receiving zone 135 of the ring 132. The spring is slightly compressed to provide a holding force sufficient to couple together the latch post assembly 110 and the receiver assembly 130. To provide a stronger connection, the handle 280 is released and the internal latch mechanism cooperates with the pin 144 of the receiver assembly 130 as described above.

The embodiments shown in the drawings permit the receiver assembly 30/130 to swivel about the post 16/116 by a user applying a rotational force. When this force is removed, frictional forces between the spring 42/142 and post 16/116 inhibit further rotation.

Figure 43:
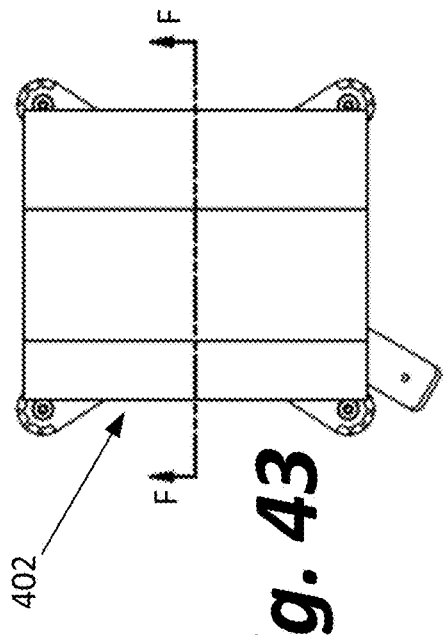
FIG. 43 is a top view of the assembly of FIG. 42.
Figure 44:
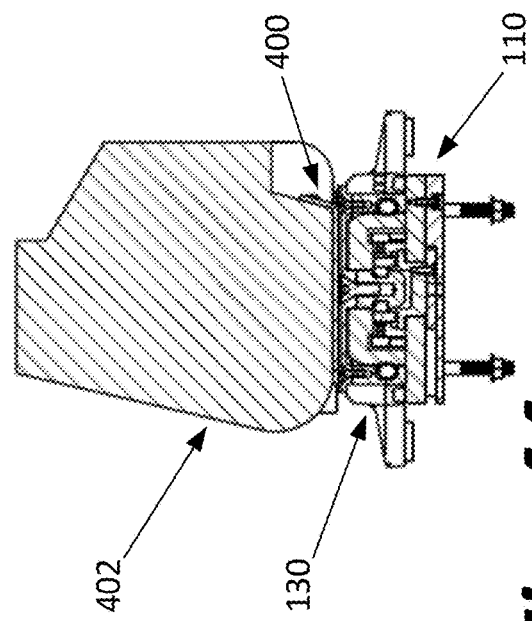
FIG. 44 is a cross-sectional view through line F-F in FIG. 43.
Figure 42:
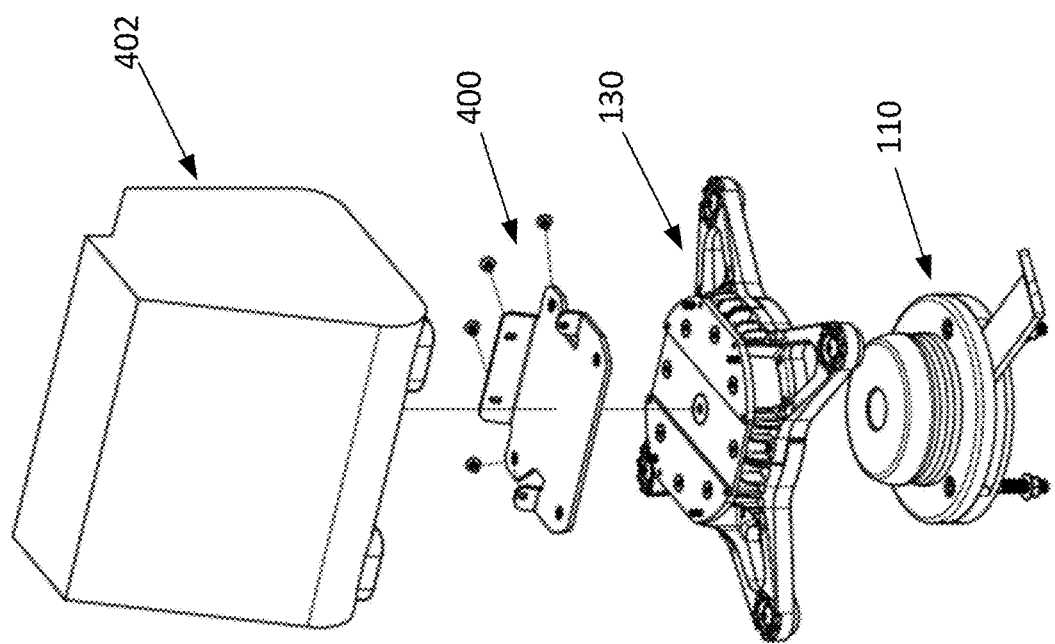
FIG. 42 is an exploded perspective view of the mount of FIG. 18, comprising a latch post assembly and a receiver assembly, together with a piece of medical equipment and an adaptor.
Figure 45:
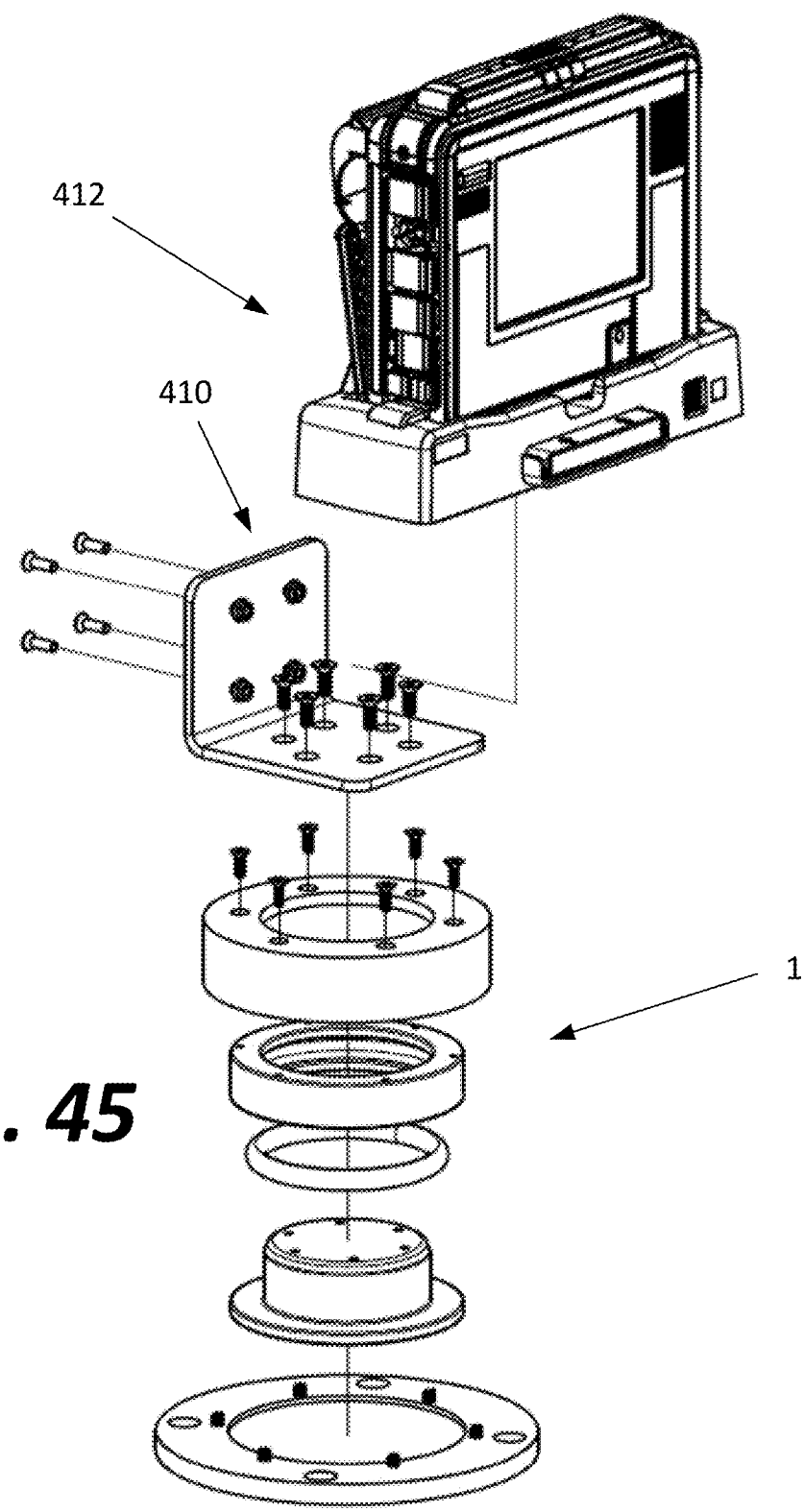
FIG. 45 is a perspective explodes view of a second alternative embodiment in which the mount of FIGS. 1 through 17 is modified to include an L-shaped interface adaptor for coupling a piece of equipment to the mount.

The mounts described above may be used to couple virtually any device to a horizontal surface. At times, it may be advantageous to also provide an L-shaped adaptor such as L-shaped adaptor 400 shown in FIGS. 42 through 44 such as when the device 402 to be attached to the horizontal surface has mounting holes in its rear. Alternatively, and as shown in FIG. 45, the interface plate 40 may be replaced with an L-shaped interface plate 410 when the mount is used to couple a device, such as device 412 having rear screw holes, to a horizontal surface.

Figure 46:
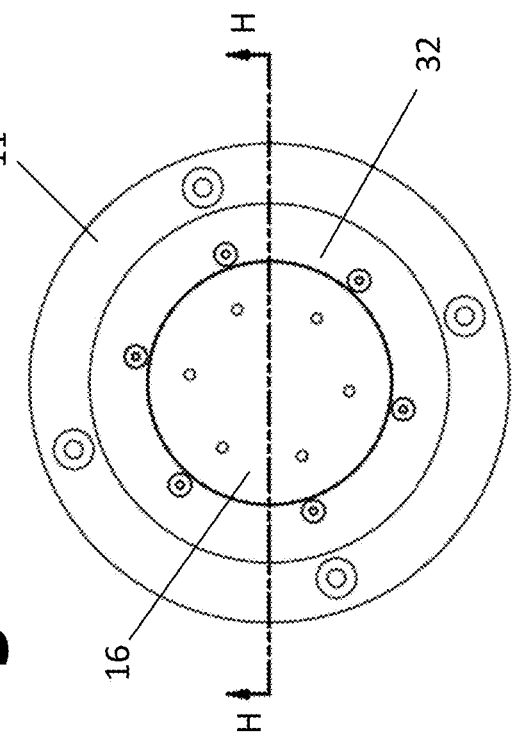
FIG. 46 is a top view of a third alternative embodiment of the mount of FIGS. 1 through 17.
Figure 47:
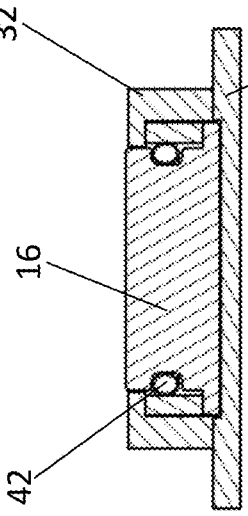
FIG. 47 is a cross-sectional view through line G-G in FIG. 46.
Figure 48:
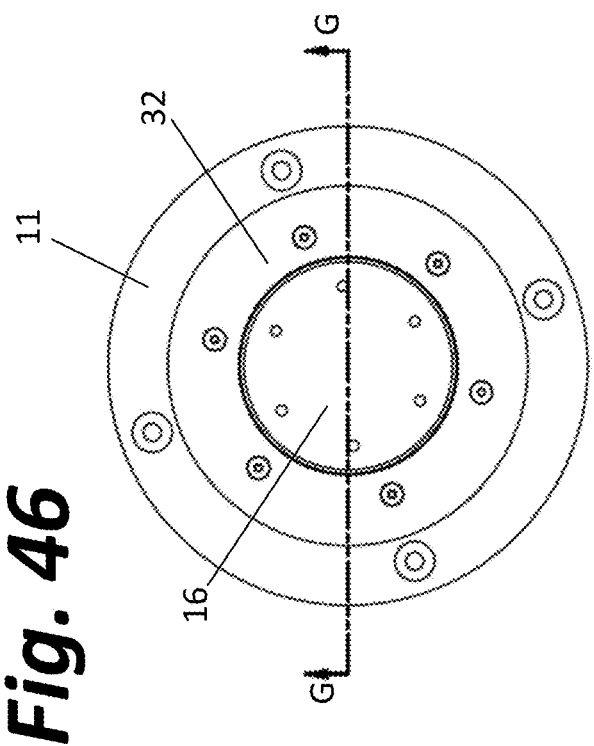
FIG. 48 is a top view of a fourth alternative embodiment of the mount of FIGS. 1 through 17.
Figure 49:
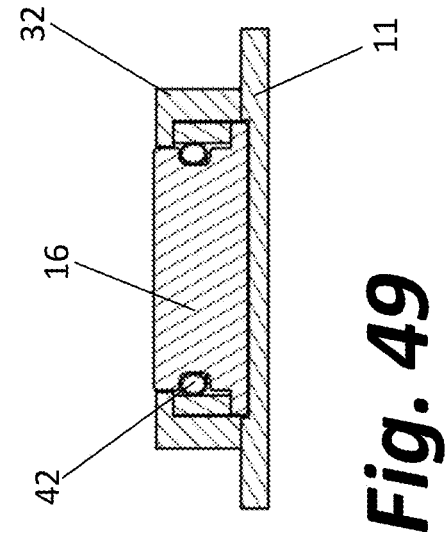
FIG. 49 is a cross-sectional view through line H-H in FIG. 48.

The mount can, of course, be modified in various other ways. For example. FIGS. 46 and 47 show the channel for retaining spring 42 formed in the ring 32. In FIGS. 48 and 49 this channel is formed in the post 16 rather than the ring. Further, the geometries shown in FIGS. 45, 47 and 49 result in an inseparable mount (i.e., the latch post assembly and the receiver assembly are permanently fixed together) and still permits free rotation of the latch post assembly relative to the receiver assembly.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. For mounting a device to a surface, a mounting assembly comprising:
   a) a latch post assembly comprising a base plate and a post, said base plate having a first center section and a first outer section, said post projecting from the first center section of the base plate, said post including a side wall terminating in a top surface, said sidewall including a concave surface extending around the post intermediate of the base plate and the top surface, said post having a central channel open at the top surface, said first outer section of the base plate adapted to enable the latch post assembly to be mounted to a surface, said latch post assembly further comprising first and second latch members movable between a latched position and an unlatched position;
   b) a receiver assembly comprising an interface plate, a ring, a pin adapted to be engaged by the first and second latch members when said first and second latch members are in their latched position and disengaged from said first and second latch members when said first and second latch members are in their disengaged position, and a spring, said interface plate having a second center section, an intermediate section and a second outer section, said pin projecting in a first direction from second center section of the interface plate, said ring positioned concentric with the pin and projecting in the same direction as the pin from the intermediate section of the interface plate, said ring having an interior spring receiving zone, said spring positioned within said interior spring receiving zone, and said second outer section of the interface plate adapted to enable the receiver assembly to be mounted to a device, wherein the latch post assembly and the receiver assembly are adapted to be coupled together so that the pin is received within the central channel of the post, the post is received within the ring and the spring is received in a space defined by the concave surface of the post and the interior spring receiving zone of the ring.

2. The mounting assembly of claim 1 wherein the latch post assembly is permanently fixed to the receiver assembly and adapted to rotate relative to the receiver assembly.

3. The mounting assembly of claim 1 wherein said pin comprises a top section having a first pin diameter, a bottom section having a second pin diameter, and an intermediate section having a third pin diameter less than the first and second pin diameters.

4. The mounting assembly of claim 3 wherein the first and second latch members have recesses facing each other, said recess forming an opening having a first latch diameter when the first and second latches are in their latched position and a second latch diameter when the first and second latches are in the unlatched position, said first latch diameter being greater than the third pin diameter and less than the first and second pin diameters, and said second latch diameter being greater than said first and second pin diameters.

5. The mounting assembly of claim 1 further comprising first and second latch support walls, and first and second rails extending between said latch support walls, wherein said first and second latch members are adapted to be mounted on the first and second rails and reciprocally slide along the first and second rails between the latch position and the unlatched position.

6. The mounting assembly of claim 5 further comprising a cam coupled adapted to rotate in a first direction and a second direction, wherein rotation of the cam in the first direction causes the first and second latch members to move from the latched to the unlatched position, and wherein rotation of the cam in the second direction permits the latch members to return to the latched position.

7. The mounting assembly of claim 6 wherein said cam is coupled to a handle.

8. The mounting assembly of claim 5 further comprising a plurality of latch member engaging springs adapted to force the first and second latch members toward the latched position.

9. The mounting assembly of claim 8 wherein the plurality of springs comprises four latch member engaging springs, two of which are positioned on the rails between the first latch support wall and the first latch member and the other two of which are positioned on the rails between the second latch support wall and the second latch member.

10. The mounting assembly of claim 1 wherein the first center section is recessed relative to the first outer section and said post has a bottom portion adapted to be received within the recessed first center section.

11. For mounting a device to a surface, a mounting assembly comprising:
 a) a latch post assembly comprising a base plate and a post, said base plate having a first center section and a first outer section, said post projecting from the first center section of the base plate, said post including a side wall terminating in a top surface, said sidewall including a concave surface extending around the post intermediate of the base plate and the top surface, said post having a central channel open at the top surface, said first outer section of the base plate adapted to enable the latch post assembly to be mounted to a surface, said latch post assembly further comprising first and second latch members movable between a latched position and an unlatched position;
 b) a receiver assembly comprising an interface plate, a ring, a pin adapted to be engaged by the first and second latch members when said first and second latch members are in their latched position and disengaged from said first and second latch members when said first and second latch members are in their disengaged position, a spring, and a plurality of legs extending outwardly from said ring, said interface plate having a second center section, an intermediate section and a second outer section, said pin projecting in a first direction from second center section of the interface plate, said ring positioned concentric with the pin and projecting in the same direction as the pin from the intermediate section of the interface plate, said ring having an interior spring receiving zone, said spring positioned within said interior spring receiving zone, and said second outer section of the interface plate adapted to enable the receiver assembly to be mounted to a device, wherein the latch post assembly and the receiver assembly are adapted to be coupled together so that the pin is received within the central channel of the post, the post is received within the ring and the spring is received in a space defined by the concave surface of the post and the interior spring receiving zone of the ring.

12. The mounting assembly of claim 11 further comprising an adaptor for joining a device to the receiver assembly.

13. The mounting assembly of claim 11 wherein each of said legs include openings extending therethrough.

14. The mounting assembly of claim 11 wherein said pin has a free end and a fixed end, and comprises a first section having a first pin diameter adjacent the free end and a second section having a second pin diameter, said second pin diameter being less than the first pin diameter.

15. The mounting assembly of claim 14 wherein the first and second latch members have recesses facing each other, said recess forming an opening having a first latch diameter when the first and second latches are in their latched position and a second latch diameter when the first and second latches are in the unlatched position, said first latch diameter being greater than the second pin diameter and less than the first pin diameter, and said second latch diameter being greater than said first pin diameter.

16. The mounting assembly of claim 11 further comprising first and second latch support walls, and first and second rails extending between said latch support walls, wherein said first and second latch members are adapted to be mounted on the first and second rails and reciprocally slide along the first and second rails between the latch position and the unlatched position.

17. The mounting assembly of claim 16 further comprising a cam coupled adapted to rotate in a first direction and a second direction, wherein rotation of the cam in the first direction causes the first and second latch members to move from the latched to unlatched position, and wherein rotation of the cam in the second direction permits the latch members to return to the latched position.

18. The mounting assembly of claim 17 wherein said cam is coupled to a handle.

19. The mounting assembly of claim 16 further comprising a plurality of latch member engaging springs adapted to force the first and second latch members toward the latched position.

20. The mounting assembly of claim 8 wherein the plurality of springs comprises four latch member engaging springs, two of which are positioned on the rails between the first latch support wall and the first latch and the other two of which are positioned on the rails between the second latch support wall and the second latch.

* * * * *